(12) United States Patent
Miller et al.

(10) Patent No.: US 10,711,182 B2
(45) Date of Patent: Jul. 14, 2020

(54) PHOTOCHROMIC ARTICLES CONTAINING A POLYOXOMETALATE AND METHODS OF MAKING AND USING SAME

(71) Applicant: 3M INNOVATIVE PROPERTIES COMPANY, St. Paul, MN (US)

(72) Inventors: Adam D. Miller, St. Paul, MN (US); Daniel E. Isaacson, St. Paul, MN (US); Bert T. Chien, St. Paul, MN (US); William B. Kolb, Stillwater, MN (US); Matthew H. Frey, Cottage Grove, MN (US); Guanglei Du, Woodbury, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 217 days.

(21) Appl. No.: 15/741,525

(22) PCT Filed: Jun. 23, 2016

(86) PCT No.: PCT/US2016/038890
§ 371 (c)(1),
(2) Date: Jan. 3, 2018

(87) PCT Pub. No.: WO2017/007607
PCT Pub. Date: Jan. 12, 2017

(65) Prior Publication Data
US 2018/0194994 A1    Jul. 12, 2018

Related U.S. Application Data

(60) Provisional application No. 62/189,787, filed on Jul. 8, 2015, provisional application No. 62/190,402, filed on Jul. 9, 2015.

(51) Int. Cl.
*C09K 9/02* (2006.01)
*G02B 5/23* (2006.01)
(Continued)

(52) U.S. Cl.
CPC .............. *C09K 9/02* (2013.01); *C09B 57/10* (2013.01); *C09K 9/00* (2013.01); *G02B 5/23* (2013.01);
(Continued)

(58) Field of Classification Search
None
See application file for complete search history.

(56) References Cited

U.S. PATENT DOCUMENTS 4,125,665 A   11/1978   Bemmels
4,152,231 A    5/1979   St. Clair
(Continued)

FOREIGN PATENT DOCUMENTS

BR    I0905108    1/2011
JP    S 63-254112  10/1988
(Continued)

OTHER PUBLICATIONS

Miranda, "Physically and Chemically Stable Ionic Liquid-Infused Textured Surfaces Showing Excellent Dynamic Omniphobicity", APL Materials, 2014, vol. 02, pp. 056108-056108-6.

(Continued)

*Primary Examiner* — Chinessa T. Golden
(74) *Attorney, Agent, or Firm* — Adrian L. Pishko

(57) ABSTRACT

A photochromic article is provided, containing a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous material, a plurality of cavities, or both. The article is photochromic. A method of changing a light transmission of a photochromic article is provided, as is a method of changing a light reflectance of a photochromic (Continued)

article. A method of forming a photochromic article is also provided.

13 Claims, 7 Drawing Sheets

(51) Int. Cl.
*C09K 9/00* (2006.01)
*C09B 57/10* (2006.01)

(52) U.S. Cl.
CPC .... *C09K 2211/10* (2013.01); *C09K 2211/183* (2013.01)

(56) References Cited

U.S. PATENT DOCUMENTS

| | | | |
|---|---|---|---|
| 4,166,043 A | 8/1979 | Uhlmann | |
| 4,539,256 A | 9/1985 | Shipman | |
| 4,576,850 A | 3/1986 | Martens | |
| 4,623,670 A | 11/1986 | Mutoh | |
| 4,656,213 A | 4/1987 | Schlademan | |
| 4,702,836 A | 10/1987 | Mutoh | |
| 4,726,989 A | 2/1988 | Mrozinski | |
| 4,756,337 A | 7/1988 | Settineri | |
| 5,238,623 A | 8/1993 | Mrozinski | |
| 5,514,120 A | 5/1996 | Johnston | |
| 5,728,446 A | 3/1998 | Johnston | |
| 5,804,610 A | 9/1998 | Hamer | |
| 5,812,227 A | 9/1998 | Toshida | |
| 5,932,150 A | 8/1999 | Lacey | |
| 5,975,696 A | 11/1999 | Kohan | |
| 5,993,954 A | 11/1999 | Radovanovic | |
| 6,055,088 A * | 4/2000 | Fix | B32B 17/10 359/265 |
| 6,096,247 A | 8/2000 | Ulsh | |
| 6,559,192 B2 | 5/2003 | Maccone | |
| 6,632,850 B2 | 10/2003 | Hughes | |
| 6,649,249 B1 | 11/2003 | Engle | |
| 6,737,170 B2 | 5/2004 | Fitch | |
| 6,788,463 B2 | 9/2004 | Merrill | |
| 6,906,779 B2 | 6/2005 | Chan-Park | |
| 7,084,209 B2 | 8/2006 | Everaerts | |
| 7,105,809 B2 | 9/2006 | Wood | |
| 7,247,238 B2 | 7/2007 | Mullette | |
| 8,202,934 B2 | 6/2012 | Sherman | |
| 8,277,899 B2 | 10/2012 | Krogman | |
| 8,492,486 B2 | 7/2013 | Sherman | |
| 8,808,811 B2 | 8/2014 | Kolb | |
| 2004/0131872 A1* | 7/2004 | Fan | B29C 43/003 428/500 |
| 2005/0206990 A1* | 9/2005 | Yoshimura | C03C 17/36 359/277 |
| 2009/0161058 A1 | 6/2009 | Sherman | |
| 2009/0169870 A1* | 7/2009 | Zheng | C03C 17/007 428/332 |
| 2010/0149620 A1* | 6/2010 | Knowles | G02B 5/23 359/288 |
| 2011/0092606 A1 | 4/2011 | Zhou | |
| 2011/0212259 A1* | 9/2011 | Keita | C25B 11/0478 427/77 |
| 2011/0244013 A1 | 10/2011 | Mrozinski | |
| 2011/0262708 A1 | 10/2011 | Gaides | |
| 2011/0310487 A1 | 12/2011 | Nagahama | |
| 2012/0100326 A1 | 4/2012 | Sherman | |
| 2012/0295025 A1 | 11/2012 | Sherman | |
| 2012/0321911 A1 | 12/2012 | Watanabe | |
| 2013/0316076 A1 | 11/2013 | Sherman | |
| 2013/0337260 A1 | 12/2013 | Tapio | |
| 2014/0220362 A1 | 8/2014 | Milliron | |
| 2014/0290732 A1 | 10/2014 | Aizenberg | |

FOREIGN PATENT DOCUMENTS

| | | |
|---|---|---|
| JP | 2000-226572 | 8/2000 |
| JP | 2003-138058 | 5/2003 |
| JP | 2011310487 | 1/2012 |
| WO | WO 2010-002512 | 1/2010 |
| WO | WO 2010-071764 | 6/2010 |
| WO | WO 2015-054036 | 4/2015 |
| WO | WO 2016-003683 | 1/2016 |
| WO | WO 2016-003685 | 1/2016 |

OTHER PUBLICATIONS

Okada, "High-Transparency, Self-Standable Gel-SLIPS Fabricated by a Facile Nanoscale Phase Separation", ACS Applied Materials and Interfaces, 2014, vol. 06, pp. 1502-1508.

Zhang, "Molybdenum Polyoxometalate Impregnated Amino-Functionalized Mesoporous Silica Thin Films as Multifunctional, Materials for Photochromic and Electrochemical Applications", Journal of Materials Research, 2008, vol. 23, No. 01, pp. 18-26, XP002497470.

Zhong, "Polyoxometalate Cured Epoxy Resins with Photochromic Properties", Colloid and Polymer Science, 2012, vol. 290, pp. 1683-1693.

International Search Report for PCT International Application No. PCT/US2016/038890, dated Sep. 15, 2016, 5 pages.

* cited by examiner

PHOTOCHROMIC ARTICLES CONTAINING A POLYOXOMETALATE AND METHODS OF MAKING AND USING SAME

CROSS REFERENCE TO RELATED APPLICATIONS

This application is a national stage filing under 35 U.S.C. 371 of PCT/US2016/038890, filed Jun. 23, 2016, which claims the benefit of U.S. Application No. 62/189,787, filed Jul. 8, 2015, and U.S. Application No. 62/190,402, filed Jul. 9, 2015, the disclosures of which are incorporated by reference in their entirety herein.

TECHNICAL FIELD

The present disclosure relates to articles including a photochromic polyoxometalate and counter cation complex, such as windows, films, coatings, glazings, optical elements (e.g., ophthalmic lenses), methods of making the articles, and methods of using the articles.

BACKGROUND

There is a need in the art for improved photochromic articles such as windows, coatings, films, and optical elements. Most successful commercial applications of photochromic articles are related to ophthalmic lenses that darken in the sun and return to their initial transparency in typical indoor light. Some niche markets include the security ink and the entertainment/toy markets. There are technical challenges that prevent this technology from entering the vehicles, windows, and structural glass markets, including durability, fatigue, and switching time. The organic dyes that have been used in a majority of the photochromic systems are degraded by light and oxygen and thus their lifetimes suffer. Typical known materials do not compare well with the traits desired, for instance, in a photochromic system designed for window applications.

SUMMARY

The present disclosure provides photochromic articles, methods for making photochromic articles containing a polyoxometalate complex, and methods for changing a light transmission or light reflectance of photochromic articles.

In a first aspect, the present disclosure provides a photochromic article. The photochromic article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous material, a plurality of cavities, or both. The article is photochromic.

In a second aspect, the present disclosure provides a method of forming a photochromic article. The method includes distributing a polyoxometalate complex in a fluid and placing the fluid in contact with a structural component. The structural component comprises a porous material, a plurality of cavities, or a combination thereof. The polyoxometalate comprises a counter cation complexed with either a polyoxometalate anion or a polyoxometalate derivative anion.

In a third aspect, the present disclosure provides a method of changing a light transmission of a photochromic article. The method includes providing a photochromic article and exposing the photochromic article to light wavelengths of 300 nm to 400 nm for a time of at least 2 minutes such that the article exhibits a difference in transmission of at least 1%, or at least 2%, or at least 5%. The photochromic article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous material, a plurality of cavities, or both. The article is photochromic.

In a fourth aspect, the present disclosure provides a method of changing a light reflectance of a photochromic article. The method includes providing a photochromic article and exposing the photochromic article to light wavelengths of 300 nm to 400 nm for a time of at least 2 minutes such that a reflection of the article exhibits a difference in reflectance of at least 2% or at least 5%. The photochromic article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous material, a plurality of cavities, or both. The article is photochromic.

In a fifth aspect, the present disclosure provides a reflective photochromic article, for example diffusely reflective. The article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component and fluid in contact with the structural component may be reflective, for example diffusely reflective. Alternatively, the article further comprises a reflective layer, for example a diffusely reflective layer.

Various unexpected results and advantages are obtained in exemplary embodiments of the disclosure. One such advantage of exemplary embodiments of the present disclosure is the speed of photochromic cycling of the article upon exposure to light irradiation and subsequent cessation of the irradiation, which can be in the range of seconds to minutes. Moreover, preferably, the structural component and a solvent in the fluid do not participate stoichiometrically in a photochromic redox reaction of the polyoxometalate complex.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying figures, in which.

Figure 1:
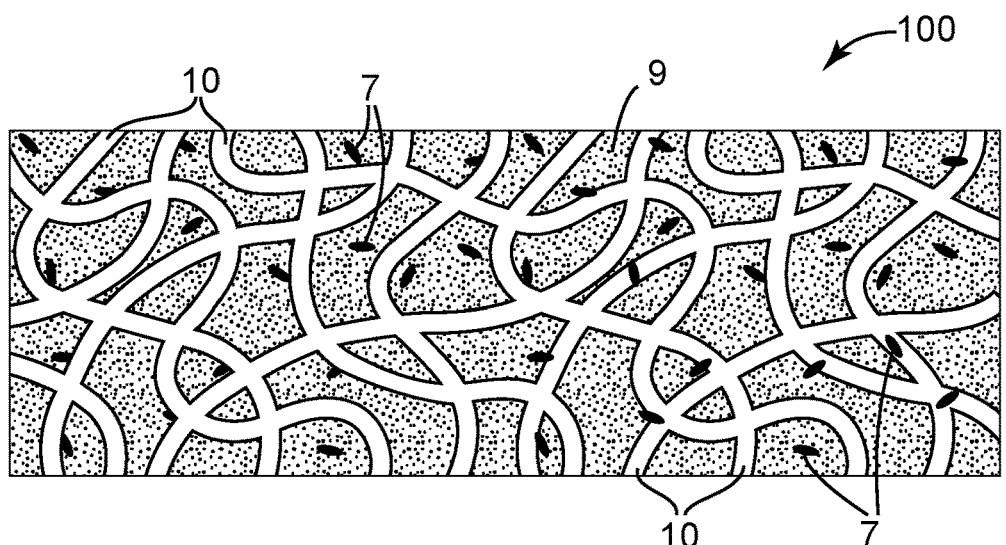
FIG. 1 is a schematic cross-sectional view of an exemplary photochromic article according to the disclosure.

While the above-identified figures, which may not be drawn to scale, relate to certain embodiments of the present disclosure, other embodiments are also contemplated, as noted in the Detailed Description.

DETAILED DESCRIPTION

As noted above, technical challenges prevent photochromic technology from entering various commercial markets, including challenges such as durability, fatigue, and switching time. The organic dyes that have been used in a majority of the photochromic systems are degraded by light and oxygen and thus their lifetimes suffer. The present disclosure provides photochromic articles, methods for making photochromic articles containing a polyoxometalate complex, and methods for changing the light transmission or reflection of photochromic articles.

Inorganic-organic hybrid materials based on polyoxometalate inorganic anions with organic functionalities which have been combined electrostatically (organic cation-inorganic anion interactions, an example of a polyoxometalate and counter cation complex) are provided to give materials that exhibit reversible photochromism in the solid state. It has been discovered that some, but not all, polyoxometalate complexes exhibit photochromism. The polyoxometalate complex comprises a counter cation complexed with either a polyoxometalate anion or a polyoxometalate derivative anion. Furthermore, it has been discovered that some polyoxometalate complexes are suitable for use with fluids, for example fluids that have solvents that do not participate in a photochromic redox reaction of the polyoxometalate complex, to give photochromic articles of high optical quality and photochromic performance, for example photochromic windows, films, corrective lenses, display cover layers, and window glazings. For instance, the polyoxometalate ion may include heteropolyoxometalates of tungsten or molybdenum, in which the hetero atom is Si, P, B, etc. The heteropolyoxometalate anion or derivative anion, and counter cation complex preferably has at least one organoammonium counter cation to enhance the reversibility of the photochromic response of the material. Such materials can then be used in applications including window films, lenses, displays, indicators, architectural glazings, automotive glazings, sensors, optical memory devices, security features on documents, decals, banners, stickers, cards, labels, information displays, and tattoos.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to components containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g., 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "fluid" refers to a liquid, a solution, or a dispersion of solid or liquid in a liquid.

The term "polyoxometalate anion" (abbreviated POM anion) refers to a discrete oxygen cluster anion generally of early transition metals, which may also include one or more of a variety of heteroatoms and that has a defined molecular structure and lacks polydispersity. Polyoxometalate anions form a structurally distinct class of complexes based predominately, although not exclusively, upon quasi-octahedrally-coordinated metal atoms. The $MO_6$ units are joined together through shared edges and/or vertices, or, less commonly, faces. Heteroatoms may be present in polyoxometalates. Different elements can act as heteroatoms, with various coordination numbers: 4-coordinate (tetrahedral) in Keggin and Wells-Dawson structures (e.g., $PO_4$, $SiO_4$); 6-coordinate (octahedral) in Anderson structure (e.g., $Al(OH)_6$, $TeO_6$); and 8-coordinate (square antiprism) e.g., $((CeO_8)W_{10}O_{28})^{8-}$.

A "lacunary polyoxometalate" refers to any poloxometalate cluster anion which is deficient in one or more addenda metals creating at least one vacant site on the cluster. The vacant site allows for chemical modification of the POM, for instance, covalent tethering of organic groups through a siloxane linker. The chemical modification of a POM anion using covalent tethering of an organic group through a siloxane linker is an example of organic modification of a POM. Such clusters are termed "derivatives of POMs", "POM derivatives", or "polyoxometalate derivatives" herein. In most, but not all, cases the free lacunary polyanion is also independently stable and isolable.

Thus, the term "polyoxometalate anion" is applied to a group of discrete anionic clusters with frameworks built from transition metal polyhedra linked by shared oxo ligands. The term is generally applied to clusters of 3 or more transition metal atoms from group 5 and group 6 in their high oxidation states, ($d^{\circ}$ and $d'$ configuration), e.g., V(V), Nb(V), Ta(V), Mo(VI) and W(VI).

A salt from a POM anion and a counter cation (that is not a proton) is called a "POM salt complex". POM salt complexes dissociate into their respective POM anions and counter cations when dissolved in a solvent, like a typical salt (e.g., NaCl in water).

A "dissolved polyoxometalate anion" (abbreviated dissolved POM anion) refers to a polyoxometalate in its discrete molecular state, dissolved in (i.e., solvated by), for example, a polymer and/or a solvent.

A "polyoxometalate anion and counter cation complex" refers to a polyoxometalate anion associated with one or more cations (herein referred to as counter cations) through ionic bonding. Thusly, a polyoxometalate and counter cation complex comprises at least one polyoxometalate anion and at least one counter cation. The counter cations of the present disclosure are not polymeric. When distributed in a fluid (e.g., a fluid solution or a fluid dispersion), the proportion (or stated differently as concentration or amount) of polyoxometalate anion and counter cation complex is given by the weight percent (also abbreviated as wt % herein) of the following components relative to the overall weight of the fluid: polyoxometalate anions plus all associated counter cations plus all associated waters of hydration (when the POM is in the solid state). Polyoxometalate anion and counter cation complexes are also referred to herein as POM and counter cation complexes.

A "polyoxometalate derivative anion and counter cation complex" refers to a polyoxometalate derivative anion associated with one or more cations (herein referred to as counter cations) through ionic bonding. Thusly, a polyoxometalate derivative anion and counter cation complex comprises at least one polyoxometalate derivative anion and at least one counter cation. The counter cations of the present disclosure are not polymeric. When distributed in a fluid (e.g., a fluid solution or a fluid dispersion), the proportion (or stated differently as concentration or amount) of polyoxometalate derivative anion and counter cation complex is given by the weight percent (also abbreviated as wt % herein) of the following components relative to the overall weight of the fluid: polyoxometalate derivative anions plus all associated counter cations plus all associated waters of hydration (when the POM derivative is in the solid state). Typically, the waters of hydration are up to 10 wt % of the total polyoxometalate derivative anion and counter cation complex. Polyoxometalate derivative anion and counter cation complexes are also referred to herein as POM derivative and counter cation complexes.

A "polyoxometalate and counter cation complex particle" (abbreviated POM and counter cation complex particle) refers to polyoxometalate anions in an aggregated state (i.e., not dissolved, but rather for instance dispersed) along with counter cations (like those described in the text below) and optionally any waters of hydration. A polyoxometalate and counter cation complex particle may be amorphous or crystalline. POM and counter cation complex particles can include POM salt complex particles, for example POM salt complex crystals.

Herein, a polyoxometalate and counter cation complex (abbreviated POM and counter cation complex) may be either aggregated (i.e., POM and counter cation complex particle) or in its molecular state (i.e., dissolved POM anion and counter cation, associated).

A "polyoxometalate derivative and counter cation complex particle" (abbreviated POM derivative and counter cation complex particle) refers to polyoxometalate derivative anions in an aggregated state (i.e., not dissolved, but rather for instance dispersed) along with counter cations (like those described in the text below) and optionally any waters of hydration. A polyoxometalate derivative and counter cation complex particle may be amorphous or crystalline. POM derivative and counter cation complex particles can include POM salt complex particles, for example POM salt complex crystals.

Herein, polyoxometalate derivative and counter cation complex (abbreviated POM derivative and counter cation complex) may be either aggregated (i.e., POM derivative and counter cation complex particle) or in its molecular state (i.e., dissolved POM derivative anion and counter cation, associated).

The term "nanoporous" refers to a porous material having pores with an average effective diameter from about 1 nanometer to about 1000 nanometers. The term "microporous" refers to a porous material having pores with an average effective diameter of less than 2 nanometers (nm). The term "mesoporous" refers to a porous material having pores with an average effective diameter between 2 nm and 50 nm. The term "macroporous" refers to a porous material having pores with an average effective diameter greater than 50 nm.

The term "photochromic article" refers to an article which reversibly changes its absorption properties (i.e., color) caused by a photochemical reaction within the material upon exposure to specific wavelengths of electromagnetic radiation. In the present text, the term shall be applied to articles which exhibit a reversible change in transmission or reflection of 2% or more.

The term "transparent" refers to an article that has a light transmission of at least 2%, or at least 5%, or at least 10%, or at least 15%, or at least 20%, or at least 30%, or at least 40%, or at least 50%, or at least 60%, or at least 70%, or at least 80%, or at least 90%, or up to 100%, or up to 99%, or up to 98%, or up to 95%, or up to 92%. Typically, the light is of a wavelength of about 390 nm to 700 nm.

The term "opaque" refers to an article that has a light transmission of less than 2%, less than 1%, less than 0.5%, or even less than 0.1%. Typically, the light is of a wavelength of about 390 nm to 700 nm.

The phrase "a solvent that does not participate in a photochromic reaction of the polyoxometalate and counter cation complex" means that there is no reaction mechanism that can be described as a stoichiometric reaction between the polyoxometalate anion and the solvent of the fluid matrix and that accounts for the majority of the observed absorbance change in aphotochromic article upon exposure to electromagnetic radiation.

The phrase "a structural component that does not participate in a photochromic reaction of the polyoxometalate and counter cation complex" means that there is no reaction mechanism that can be described as a stoichiometric reaction between the polyoxometalate anion and the structural component and that accounts for the majority of the observed absorbance change in a photochromic article upon exposure to electromagnetic radiation.

The phrase "ceasing the exposing to the light wavelengths" means the absence of the light wavelengths irradiating a material following the presence of light wavelengths irradiating the material. In certain embodiments, turning off a lamp is ceasing the exposing to the light wavelengths, whereas in certain embodiments, the sun setting is ceasing the exposing to the light wavelengths.

The term "(co)polymer" refers to polymers containing two or more different monomers.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group. The term "alkenyl group" means an unsaturated hydrocarbon group.

The term "aliphatic group" means a saturated or unsaturated linear or branched hydrocarbon group. This term is used to encompass alkyl, alkenyl, and alkynyl groups, for example.

The term "heteroalkyl group" means an alkyl group having at least one —$CH_2$— replaced with a heteroatom such as O or S.

The term "alicyclic group" means a cyclic hydrocarbon group having properties resembling those of aliphatic groups. The term "heterocyclic group" means a cyclic aliphatic group having at least one —$CH_2$— replaced with a heteroatom such as O or S.

The term "amine group" means an organic group containing a nitrogen atom.

The term "alkylamine group" means a saturated linear or branched hydrocarbon group bonded to an amine group.

The term "aromatic group" or "aryl group" means a mono- or polycyclic aromatic hydrocarbon group.

The term "imine group" means a group with a nitrogen-carbon double bond, with the nitrogen atom bound to one hydrogen atom or an organic group.

The term "(meth)acrylic" or "(meth)acrylate" is inclusive of both acrylic and methacrylic (or acrylate and methacrylate).

When a group is present more than once in a formula described herein, each group is "independently" selected, whether specifically stated or not. For example, when more than one R group is present in a formula, each R group is independently selected.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof. The below disclosure relates to each the first aspect, the second aspect, the third aspect, and the fourth aspect.

In a first aspect, the present disclosure provides a transparent photochromic article comprising a structural component; a fluid in contact with the structural component; and a polyoxometalate complex dissolved or dispersed in the fluid. The polyoxometalate complex comprises a counter cation complexed with either a polyoxometalate anion or a polyoxometalate derivative anion. The structural component comprises a porous material, a plurality of cavities, or a combination thereof. The article is photochromic. It has been discovered that contacting the polyoxometalate complex with a fluid decreases the time needed for photochromic cycling. In certain embodiments, at least a portion of the polyoxometalate complex is dissolved in the fluid, at least a portion of the polyoxometalate complex is dispersed in the fluid, at least a portion of the polyoxometalate complex is bound to the structural component, or a combination thereof.

Referring to FIG. 1, a schematic cross-sectional view of a photochromic article is provided. The transparent photochromic article 100 contains a structural component 10, a fluid 9 in contact with the structural component 10, and a polyoxometalate complex 7 in contact with the fluid. The polyoxometalate complex 7 includes a counter cation complexed with either a polyoxometalate anion or a polyoxometalate derivative anion. The structural component 10 includes a porous polymeric material.

When the structural component comprises a porous material, the porous material typically comprises a porous polymeric material or a porous glass material (e.g., porous grade VYCOR glass). Suitable porous polymeric materials include for example and without limitation a microporous film, a mesoporous film, a macroporous film, or a film comprising a combination of micropores, mesopores, macropores, or a combination thereof. The porous polymeric material comprises an average pore diameter that ranges from ten angstroms up to ten micrometers, which encompasses nanoporous materials, microporous materials, mesoporous materials, as well as macroporous materials. Some suitable porous polymeric materials include nanovoided articles as disclosed in U.S. Pat. No. 8,808,811 (Kolb et al.), and Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,539,256 (Shipman), U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.), and U.S. Patent Application Publication No. 2011/0092606 (Zhou). Porous polymeric materials for use in aspects of the present disclosure also include Solvent Induced Phase Separated (SIPS) membranes and other microporous membranes made by extrusion, extrusion/stretching and extrusion/stretching/extraction processes, and track etching processes. Suitable membranes that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable materials that may be formed by track etching processes include for example and without limitation polycarbonate and polyester. Suitable materials that may be formed by stretching techniques include for example and without limitation polytetrafluoroethylene (PTFE) and polypropylene.

In certain embodiments, a porous polymeric material comprises ethylene chlorotrifluoroethylene (ECTFE). Useful ECTFE membranes may be prepared according to U.S. Pat. No. 4,623,670 (Mutoh et al.), U.S. Pat. No. 4,702,836 (Mutoh et al.), U.S. Pat. No. 6,559,192 (Maccone et al.), U.S. Pat. No. 7,247,238 (Mullette et al.), and PCT Application US2009/067807 (Mrozinski et al.) A suitable ECTFE membrane is commercially available under trade designation PFC020-ECTFE 0.2UM from 3M Company (St. Paul, Minn.).

In some embodiments, suitable polymers for porous polymeric materials include for example and without limitation, an aliphatic polyurethane, an acrylic, a polyester, a polyimide, a polyamide, an epoxy polymer, a polystyrene, a silicone containing polymer, a fluorinated polymer, or a combination thereof.

Porous glass is glass containing pores formed by extraction (e.g., acidic or combined acidic and alkaline extraction) of phase separated alkali borosilicate glasses. Porous glass can be formed having a pore size between 0.4 and 1000 nm in a narrow pore size distribution. As stated above, a suitable porous glass is VYCOR glass, manufactured by Corning Incorporated (Corning, N.Y.).

Figure 2:
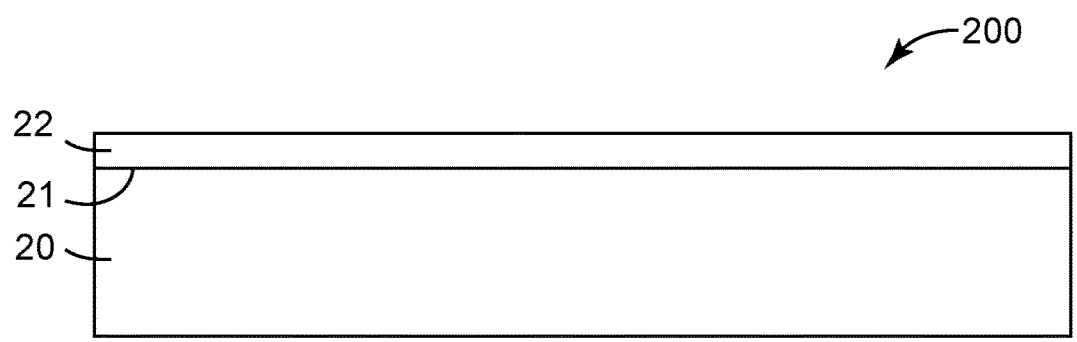
FIG. 2 is a schematic cross-sectional view of another exemplary photochromic article according to the disclosure.

Referring to FIG. 2, a schematic cross-sectional view of a photochromic article is provided. The photochromic article 200 contains a structural component 20, a fluid (not shown) in contact with the structural component 20, and a polyoxometalate complex (not shown) in contact with the fluid. The photochromic article 200 further includes a layer 22 disposed on a first major surface 21 of the structural component 20. The layer 22 is oxygen-permeable and typically comprises a polymeric material. Often a layer is employed to provide at least some protection to the surface of the structural component from potentially damaging contact or minimizing evaporation of the fluid or fluid solvent. Suitable polymeric materials include for example and without limitation, solventless resin formulations that comprise a combination of at least two components selected from difunctional (meth)acrylate monomers, difunctional (meth) acrylate oligomers, and mixtures thereof. In some instances, the resin comprises a majority of aliphatic urethane diacrylate oligomer which gives a material with a low modulus (e.g., $10^7$ Pa at 25° C.) after curing. Conversely, the resin may comprise a majority of bisphenol-A ethoxylated diacrylate to give a material with a high modulus (e.g., $10^8$ Pa at 25° C.) upon curing. See, for example, U.S. Publication No. 2011/0262708 (Gaides et al.). For instance, a resin can be applied onto a porous film and laminated with a release liner, followed by curing, such as by 4 passes with a Fusion Systems Model MC-6RQN configured with an H-bulb (available from Fusion UV Systems, Gaithersburg, Md.). The thickness of a polymeric layer can be less than 125 micrometers, or less than 100 micrometers, or less than 80 micrometers, or less than 60 micrometers, or less than 40 micrometers, or less than 25 micrometers, or even less than 15 micrometers, and at least 1 micrometer, or at least 2 micrometers, or at least 5 micrometers, or at least 10 micrometers. Additional oxygen-permeable materials useful for the layer comprise a porous glass, a fluoropolymer, a polypropylene, or a combination thereof. For the photochromic reaction to proceed, oxygen passes through the oxygen-permeable material to participate in the redox reaction of the polyoxometalate anion or polyoxometalate derivative anion with the counter cation. The higher the oxygen permeability of a material, the faster the photochromic reaction can potentially occur.

Figure 3:
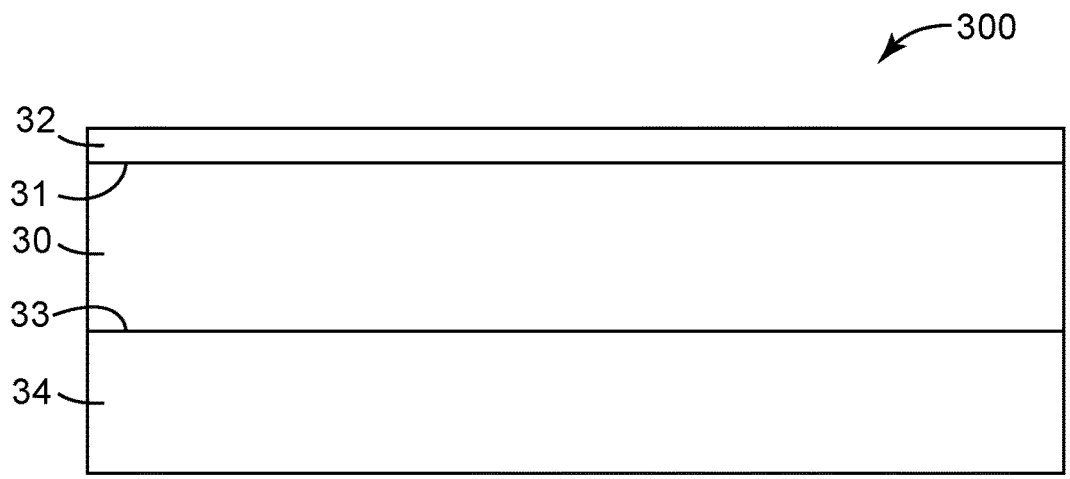
FIG. 3 is a schematic cross-sectional view of a further exemplary photochromic article according to the disclosure.

Referring to FIG. 3, a schematic cross-sectional view of a photochromic article is provided. The photochromic article 300 contains a structural component 30, a fluid (not shown) in contact with the structural component 30, and a polyoxometalate complex (not shown) in contact with the fluid. The photochromic article 300 further includes a layer 32 disposed on a first major surface 31 of the structural component 30 and a transparent substrate 34 disposed on a second major surface 33 of the structural component 30. The transparent substrate typically comprises a glass, polycarbonate, polyethylene terephthalate (PET), poly(methyl methacrylate) (PMMA) or a combination thereof. While in certain embodiments the structural component provides sufficient mechanical integrity for the photochromic article, in some embodiments a transparent substrate is employed in the photochromic article. The layer 32 is generally as described above with respect to FIG. 2.

Figure 4:
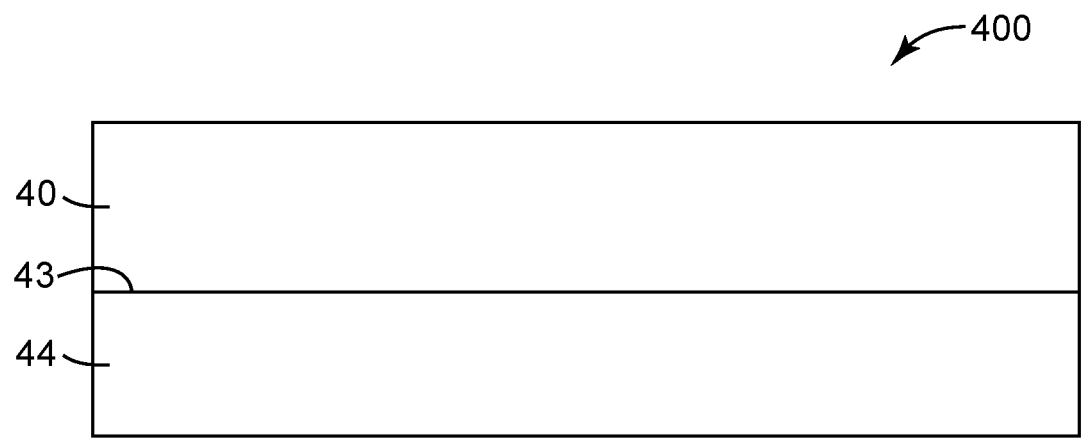
FIG. 4 is a schematic cross-sectional view of yet another exemplary photochromic article according to the disclosure.

Referring to FIG. 4, a schematic cross-sectional view of a photochromic article is provided. The photochromic article 400 contains a structural component 40, a fluid (not shown) in contact with the structural component 40, and a polyoxometalate complex (not shown) in contact with the fluid. The photochromic article 400 further includes a transparent substrate 44 disposed on a major surface 43 of the structural component 40. As noted above, the transparent substrate typically comprises a glass, polycarbonate, PET, PMMA, or a combination thereof.

Figure 5:
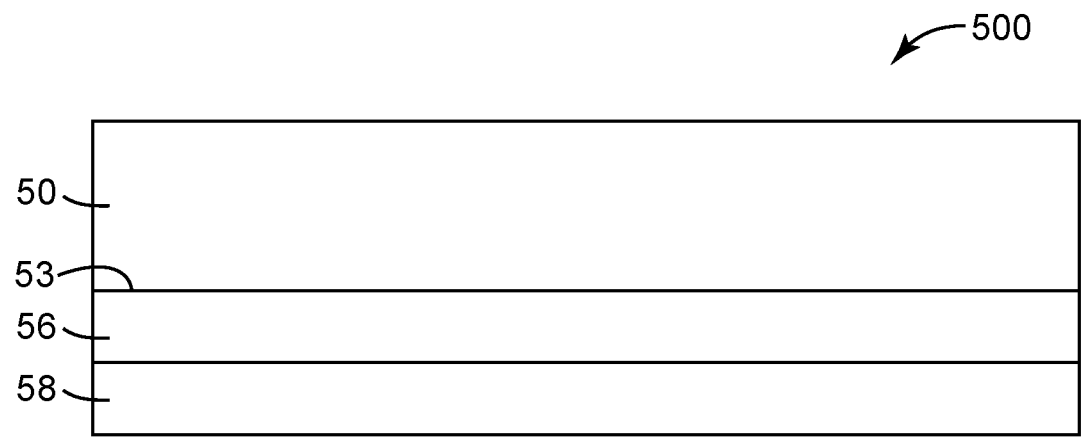
FIG. 5 is a schematic cross-sectional view of a still further exemplary photochromic article according to the disclosure.

Referring to FIG. 5, a schematic cross-sectional view of a photochromic article is provided. The photochromic article 500 contains a structural component 50, a fluid (not shown) in contact with the structural component 50, and a polyoxometalate complex (not shown) in contact with the fluid. The photochromic article 500 further includes an adhesive 56 disposed on a major surface 53 of the structural component 50. Those skilled in the art will be able to select suitable adhesives, for example and without limitation hot melt adhesives, heat activated adhesives, or pressure sensitive adhesives, dependent in large part upon the desired application of the photochromic article.

Illustrative suitable tackified rubber hot melt adhesives are disclosed in U.S. Pat. Nos. 4,125,665, 4,152,231, and 4,756,337. Illustrative suitable acrylic hot melt adhesives are disclosed in U.S. Pat. Nos. 4,656,213 and 5,804,610. Further illustrative adhesives that may be applied as hot melt adhesives suitable for use with photochromic articles of the disclosure are disclosed in U.S. Pat. Nos. 8,492,486, 8,202,934, and 7,084,209.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky. Examples of suitable heat activated adhesives include polyacrylate hot melt adhesives, polyvinyl butyrals, ethylene vinyl acetate, ionomers, polyolefins, or combinations thereof.

Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power. Obtaining the proper balance of properties is not a simple process. Pressure-sensitive adhesives useful in the present invention include tackified natural rubbers, synthetic rubbers, tackified styrene block copolymers, polyvinyl ethers, acrylics, poly-o-olefins, and silicones. Illustrative pressure sensitive adhesives that are suitable for use in the invention are described in US Application Publication Nos. 2013/0337260 (Tapio et al.), 2013/0316076 (Sherman), 2012/0295025 (Sherman et al.), 2012/0100326 (Sherman et al.), and 2009/0161058 (Sherman).

Still referring to FIG. 5, to protect the adhesive prior to use in adhering the transparent photochromic article 500 to an object or structure, in certain embodiments a liner 58 is disposed on the adhesive 56 opposite the structural component 50. Stated another way, the adhesive 56 is disposed between the structural component 50 and the liner 58. The release liner is formed from, or coated with, a material that releases cleanly from the adhesive when peeled off by the end user, in embodiments transferring substantially no residue of the release liner material on or in the adhesive. Such release liners are well known by those of skill and any of the conventionally employed release liners are suitably applied to the adhesive, for example silicone-coated paper.

Figure 6:
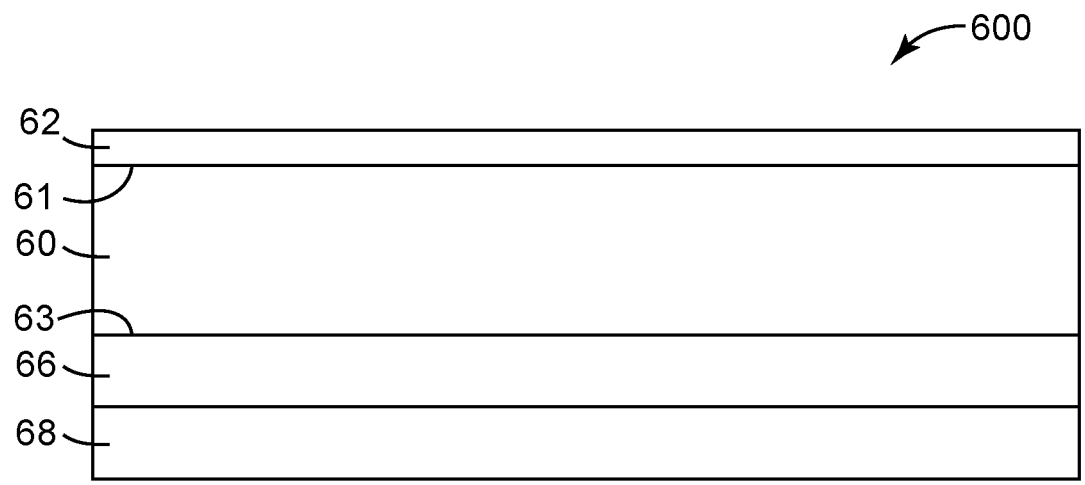
FIG. 6 is a schematic cross-sectional view of an additional exemplary photochromic article according to the disclosure.

Referring now to FIG. 6, a schematic cross-sectional view of a photochromic article is provided. The photochromic article 600 contains a structural component 60, a fluid (not shown) in contact with the structural component 60, and a polyoxometalate complex (not shown) in contact with the fluid. The photochromic article 600 further includes a layer 62 disposed on a first major surface 61 of the structural component 60, an adhesive 66 disposed on a second major surface 63 of the structural component 60, and a liner 68 disposed on the adhesive 66 opposite the structural component 60. The layer 62 is generally as described above with respect to FIG. 2.

Figure 7:
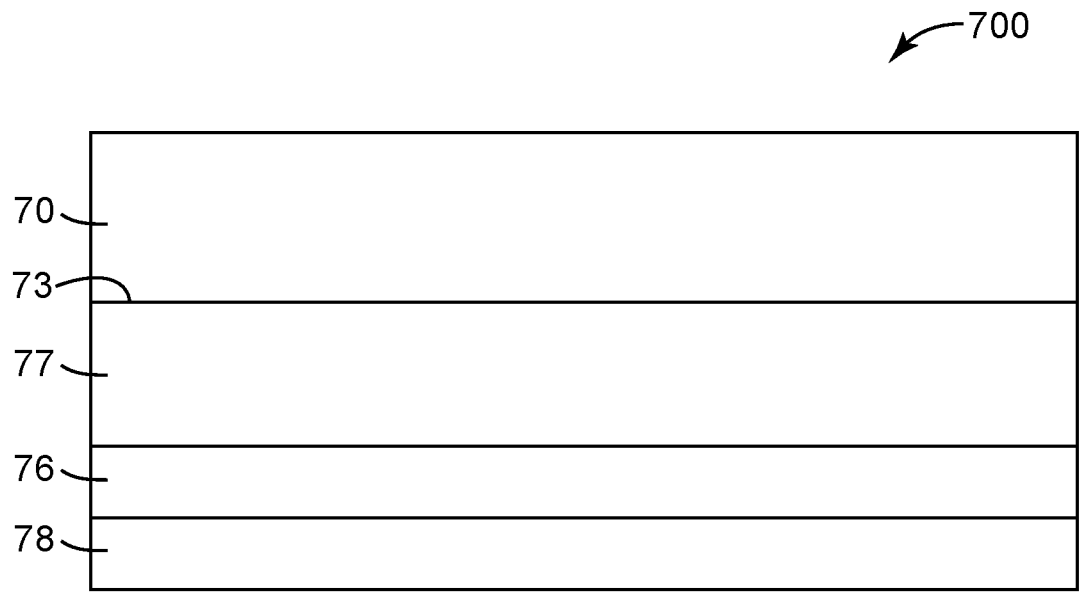
FIG. 7 is a schematic cross-sectional view of a further additional exemplary photochromic article according to the disclosure.

Referring to FIG. 7, a schematic cross-sectional view of a photochromic article is provided. The photochromic article 700 contains a structural component 70, a fluid (not shown) in contact with the structural component 70, and a polyoxometalate complex (not shown) in contact with the fluid. The photochromic article 700 further includes a polymer film layer 77 disposed on a first major surface 73 of the structural component 70. In addition, the photochromic article includes an adhesive 76 disposed on the polymer film layer 77 opposite the structural component 70, and a liner 78 disposed on the adhesive 76 opposite the polymer film layer 77. Optionally, the polymer film layer provides further mechanical integrity to the structural component to prevent damage to the photochromic article during manufacture, transport, and/or use.

Figure 8:
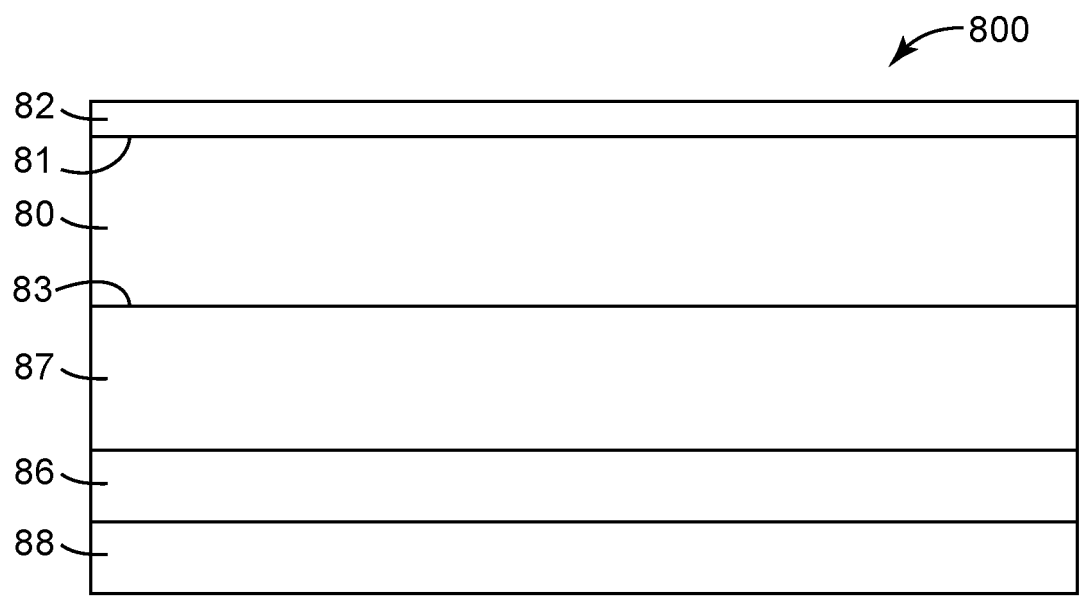
FIG. 8 is a schematic cross-sectional view of another exemplary photochromic article according to the disclosure.

Referring to FIG. 8, similar to FIG. 7, a schematic cross-sectional view of a photochromic article is provided. The photochromic article 800 contains a structural component 80, a fluid (not shown) in contact with the structural component 80, and a polyoxometalate complex (not shown) in contact with the fluid. The photochromic article 800 also includes a layer 82 disposed on a first major surface 81 of the structural component 80. The transparent photochromic article 800 further includes a polymer film layer 87 disposed on a second major surface 83 of the structural component 80. In addition, the photochromic article 800 includes an adhesive 86 disposed on the polymer film layer 87 opposite the structural component 80, and a liner 88 disposed on the adhesive 86 opposite the polymer film layer 87. The layer 82 is generally as described above with respect to FIG. 2.

Figure 9:
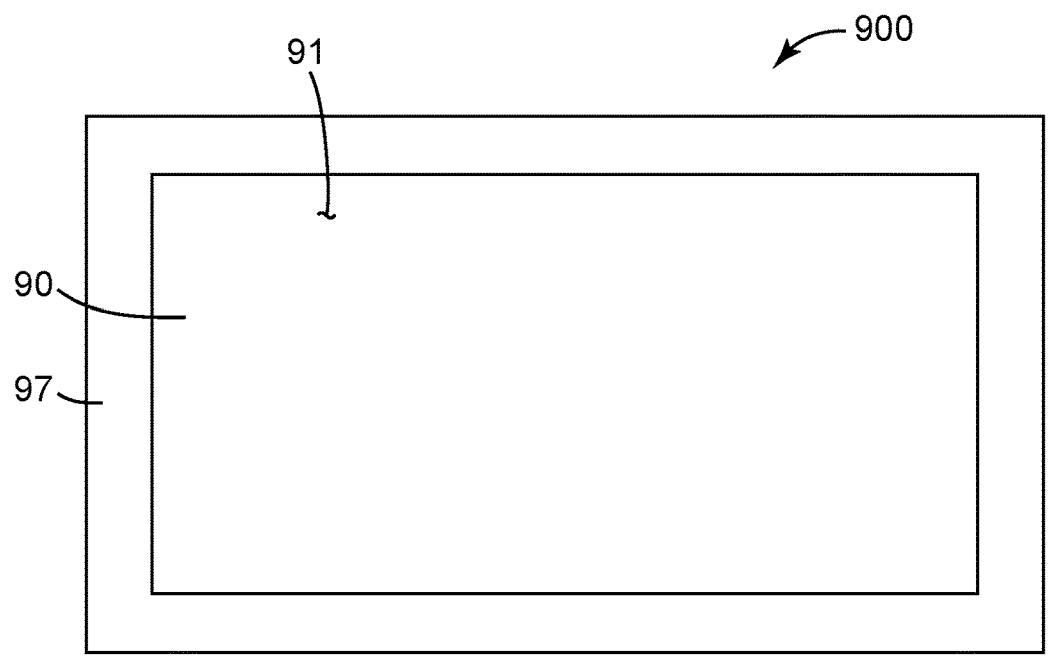
FIG. 9 is a schematic top view of a further exemplary photochromic article according to the disclosure.

As an alternative to (or in addition to) employing a substrate such as a polymer film layer and/or a transparent substrate like glass, the transparent article optionally includes a frame around at least a portion of the perimeter of the structural component of the photochromic article. Referring to FIG. 9, a schematic top view of a photochromic article is provided. The photochromic article 900 contains a structural component 90, a fluid (not shown) in contact with the structural component 90, and a polyoxometalate complex (not shown) in contact with the fluid. The photochromic article 900 also includes a frame 97 attached to a major surface 91 of the structural component 90. A frame can provide mechanical integrity to the photochromic article without requiring completely covering a major surface of the structural component. Further, the frame can be the point of attachment of the photochromic article to an object or structure (e.g., building window, etc.)

Figure 10:
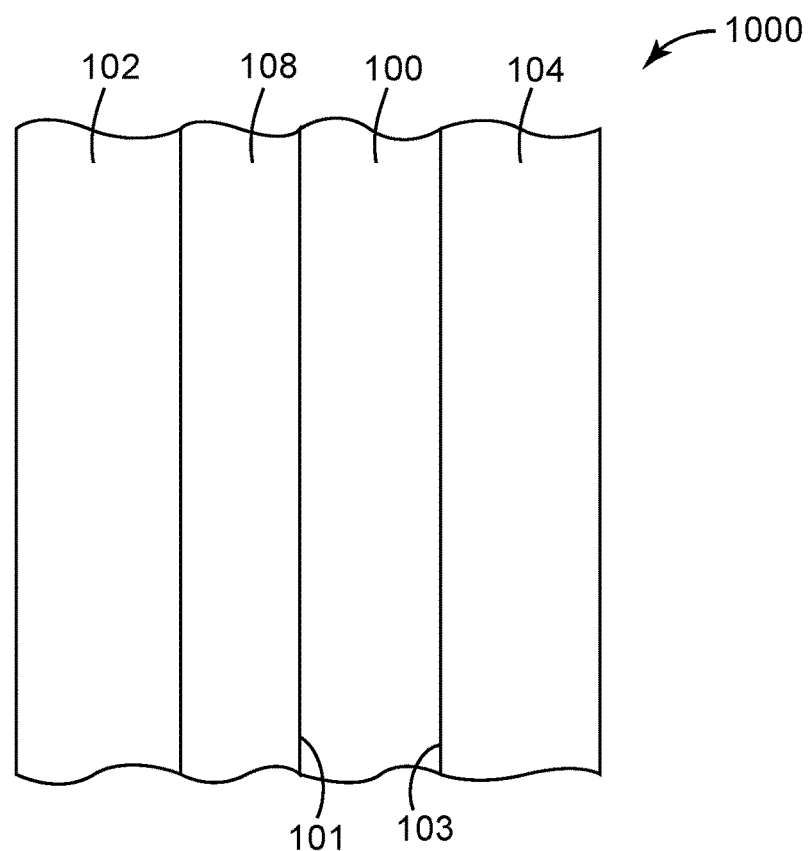
FIG. 10 is a schematic cross-sectional view of a still further exemplary photochromic article according to the disclosure.

Referring to FIG. 10, a schematic cross-sectional view of a photochromic article is provided. The photochromic article 1000 contains a structural component 100, a fluid (not shown) in contact with the structural component 100, and a polyoxometalate complex (not shown) in contact with the fluid. The photochromic article 1000 further includes a first oxygen-permeable material 104 disposed on a first major surface 103 of the structural component 100, and a second oxygen-permeable material 102 disposed adjacent to a second major surface 101 of the structural component. In the illustrated embodiment, atmosphere 108 is disposed between the second oxygen-permeable material 102 and the structural component 100. As noted above, the oxygen-permeable material typically comprises a porous glass, a fluoropolymer, a polypropylene, or a combination thereof. Alternatively, the photochromic article 1000 comprises a first material 104 that is not oxygen permeable disposed on a first major surface 103 of the structural component 100, and a second material 102 that is not oxygen permeable disposed adjacent to a second major surface 101 of the structural component. In such an embodiment, an oxygen-rich gas 108 is disposed between the second material 102 and the structural component 100. In certain embodiments, such a transparent photochromic article is incorporated into a multi-pane window.

When the structural component comprises a plurality of cavities, the structural component typically includes a plurality of interior cavities (e.g., wells, pockets, regions, etc.), at least one of the cavities comprising a channel, or a combination thereof. Structural components having a structured surface region generally comprise a combination of protrusive features and intrusive features. Some of these features can function to exclude, retain, or provide for a combination of excluding or retaining fluid compositions disposed onto a structured surface region. The surfaces of the protrusive or intrusive features can be smooth, partially smooth, textured, or a combination thereof. The features can be nano-replicated, micro-replicated, macro-replicated and the like. Some structured surface regions can comprise nano-replicated, micro-replicated, and macro-replicated features and patterns as similarly described in U.S. Pat. No. 6,649,249 (Engle et al.) and U.S. Pat. No. 7,105,809 (Wood et al.). One illustrative method for replicating the surface structural features of a master mechanical tool into the surface of another material is through thermal embossing (U.S. Pat. No. 6,096,247 (Ulsh et al.), U.S. Pat. No. 5,932,150 (Lacey)). For the preparation of thermally embossed materials, it is often convenient and useful to start with material in film form. Optionally, a film for embossing can include multiple layers (U.S. Pat. No. 6,737,170 (Fitch et al.), U.S. Pat. No. 6,788,463 (Merrill et al.)). Another approach for replicating the surface structure of a master mechanical tool into the surface of polymer is to cure a flowable precursor to the polymer while in contact with the master mechanical tool. Generally, a precursor to the cured polymer can be cast onto a master mechanical tool or into a mold, followed by curing (U.S. Pat. No. 4,576,850 (Martens)). Hence, in certain embodiments, the structural component comprises an embossed polymer, a molded polymer, or a combination thereof. In certain embodiments, the structural component comprises glass. In some embodiments, the structured surface region of the substrate can include regular or random features. These features can be spatially located throughout the structured surface region.

Figure 11A:
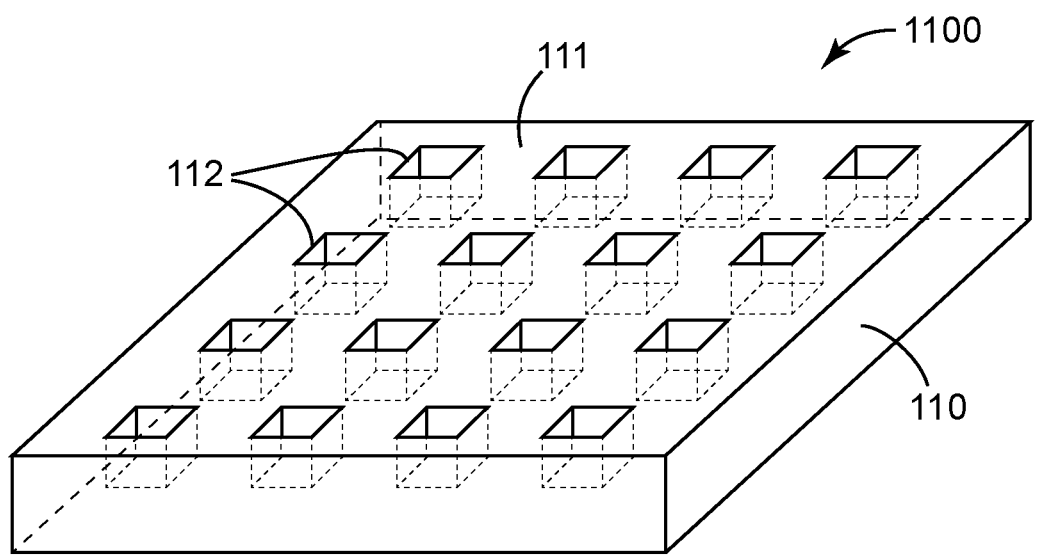
FIG. 11A is a schematic perspective view of an exemplary structural component according to the disclosure.
Figure 11B:
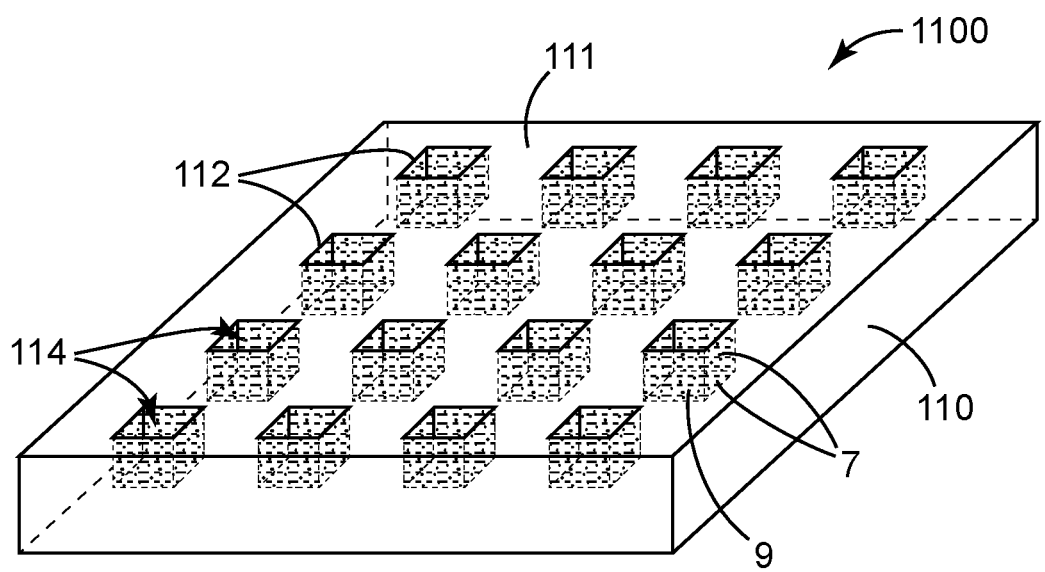
FIG. 11B is a schematic perspective view of an exemplary photochromic article including the structural component of FIG. 11A according to the disclosure.

Referring to FIG. 11A, a schematic perspective view of a photochromic article is provided. The photochromic article 1100 contains a structural component 110 that comprises a plurality of cavities 112 formed in a first major surface 111 of the structural component. The cavities are illustrated to be cubic wells, but could certainly be any conceivable shape. In certain embodiments, when the structural component comprises a plurality of interior cavities, the fluid at least partially fills at least a portion of the interior cavities. Turning now to FIG. 11B, a schematic perspective view of the transparent photochromic article of FIG. 11A is provided, further including a fluid 9 in contact with the structural component 110, and a polyoxometalate complex 7 in contact with the fluid. The fluid 9 at least partially fills at least a portion of the interior cavities 112.

Figure 12:
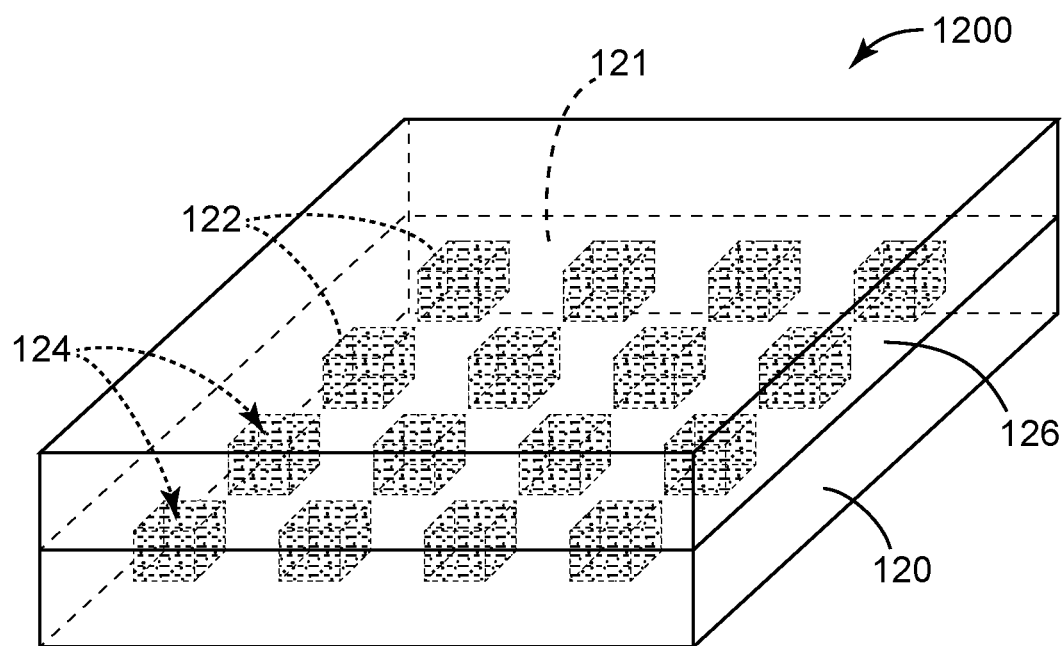
FIG. 12 is a schematic perspective view of another exemplary photochromic article according to the disclosure.

Referring to FIG. 12, a schematic perspective view of a photochromic article is provided. The photochromic article 1200 contains a structural component 120 that comprises a plurality of cavities 122 formed in a first major surface 121 of the structural component 120. The photochromic article 1200 further includes an oxygen-permeable material 126 disposed on the first major surface 121 of the structural component 120. As noted above, the oxygen-permeable material typically comprises a porous glass, a fluoropolymer, a polypropylene, or a combination thereof.

Figure 13:
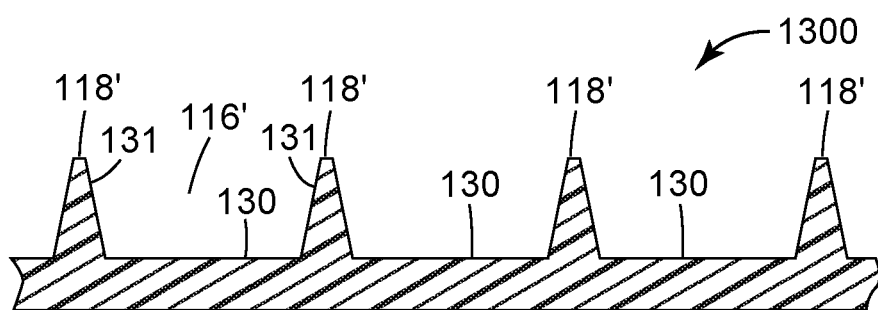
FIG. 13 is a schematic cross-sectional view of an exemplary structural component according to the disclosure.

In certain embodiments, when the structural component comprises a plurality of cavities, at least one of the cavities is a channel, and the fluid at least partially fills the channel Referring to FIG. 13, a schematic cross-sectional view of a structural component 1300 including channels 116' that have a wide flat valley between slightly flattened peaks 118'. In this embodiment, bottom surfaces 130 extend between channel sidewalls 131. Other suitable channel and wall configurations for structural components having at least one channel will be apparent to one of skill in the art. In embodiments comprising at least one channel, a suitable structural component comprises a sheet or film having microstructured surfaces including a plurality of open channels having a high aspect ratio (that is, channel length divided by the wetted channel perimeter). The channels are precisely replicated, with high fidelity, from a predetermined pattern and typically form a series of individual open capillary channels that extend along a major surface. Microreplicated channels formed in sheets, films, or tubes are preferably uniform and regular along substantially each channel length and more preferably from channel to channel. Suitable films having microstructured channels are described, for instance, in U.S. Pat. No. 5,514,120 (Johnston et al.); and U.S. Pat. No. 5,728,446 (Johnston et al.).

In most embodiments, a transparent photochromic article exhibits a difference in transmission of at least 1%, or at least 2%, or at least 5%, or at least 7%, or at least 10%, after exposure to light wavelengths of 300 nm to 400 nm for a time of at least 2 minutes.

A transparent photochromic article comprises a light transmission of at least 2%, or at least 5%, or at least 10%, or at least 15%, or at least 20%, or at least 30%, or at least 40%, or at least 50%, or at least 60%, or at least 70%, or at least 80%, or at least 90%. A transparent photochromic article comprises a light transmission of up to 100%, or up to 99%, or up to 98%, or up to 95%, or up to 92%, or up to 90%, or up to 85%, or up to 80%, or up to 75%, or up to 70%.

In certain embodiments, a transparent photochromic article comprises a haze of up to 20%, or up to 15%, or up to 10%, or up to 8%, or up to 5%, or even up to 2%. Selecting fluids and structural components that have similar refractive indices assists in providing a photochromic article being more optically clear, and thus lower haze, than when the fluids and structural component have less similar refractive indices.

In certain embodiments, the fluid comprises a solvent having a boiling point of 150 degrees Celsius or higher, a polyalkylene oxide, an ionic liquid, a plasticizer, or a combination thereof. A high boiling solvent assists in minimizing evaporation of the fluid from the article over time. Suitable high boiling point solvents include for instance and without limitation, N,N-dimethylformamide, hexamethylphosphoramide, 1-methyl-2-pyrrolidinone, dimethylsulfoxide, dimethylacetamide, or a combination thereof. A suitable polyalkylene oxide comprises polyethylene glycol having a molecular weight less than or equal to 600 grams per mole, such as less than or equal to 400 grams per mole, or less than or equal to 200 grams per mole. In certain embodiments, the fluid is a component of a gel comprising a crosslinked polyalkylene oxide.

When in contact with the fluid, typically at least a portion of the polyoxometalate complex is dissolved in the fluid, at least a portion of the polyoxometalate complex is dispersed in the fluid, at least a portion of the polyoxometalate complex is bound to the structural component, or a combination thereof. Advantageously, in most embodiments the fluid comprises a solvent that does not participate stoichiometrically in a photochromic redox reaction of the polyoxometalate complex. Participation, particularly stoichiometrically, by a material in a photochromic redox reaction with a polyoxometalate distributed therein creates a potential pathway for photolytic degradation of the fluid, and loss of physical or chemical integrity for the overall material, or other potentially important properties (e.g., optical transparency). The approach taken with the compositions of the present disclosure (of contacting the polyoxometalate complex with a fluid comprising a solvent that does not participate in the photochromic redox reaction) includes decoupling the photochromic redox reaction from other demands on the fluid.

The articles of the present disclosure may also contain one or more conventional additives. Preferred additives include tackifiers, plasticizers, dyes, antioxidants, and UV stabilizers. Such additives can be used if they do not affect the photochromic properties of the article.

The polyoxometalate anion often comprises a Keggin structure. A Keggin structure has a general formula of $[XM_{12}O_{40}]^{n-}$, where X is the heteroatom and M is the addenda atom. The Keggin structure is often the most facile structure of polyoxometalate complexes to isolate. In alternate aspects, the polyoxometalate and counter cation complex comprises a Wells-Dawson structure. A Wells-Dawson structure is made up of two Keggin lacunary fragments with three missing octahedra.

In some embodiments, the polyoxometalate complex comprises a counter cation complexed with a polyoxometalate anion and in some embodiments the polyoxometalate complex comprises a counter cation complexed with a polyoxometalate derivative anion.

In certain embodiments, the polyoxometalate complex comprises a counter cation complexed with a polyoxometalate anion, wherein the polyoxometalate anion is of formula (I):

(I)

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

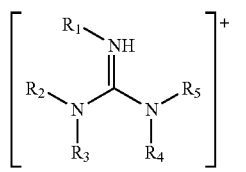

(II)

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

(III)

wherein:
$R_6$ is H, an alkyl group, an alkylamine group, or an alicyclic group; $R_7$ is an alkyl group or an alkylamine group; $R_8$ is H or an alkyl group; and

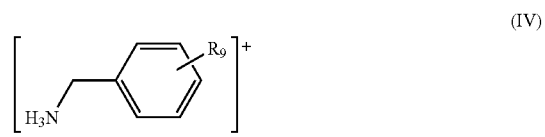

(IV)

wherein $R_9$ is C≡N, an alkoxy group, an alkyl group, an alkenyl group, or an aryl group; and the polyoxometalate complex optionally includes at least one monatomic counter cation.

In certain embodiments, the one or more early transition metal includes M or M' as being W or Mo. The number of early transition metal atoms, m, is from 3 to 248, such as from 3 to 18. When a heteratom, X, is present in the polyoxometalate, it is typically silicon (Si), boron (B), phosphorous (P), or germanium (Ge). The number of oxygen (O) atoms, y, is from 10 to 720, such as from 10 to 62. The negative charge, q, of the polyoxometalate anion is from 1 to 20, such as from 2 to 10. Typically, the number of charges given by counter cations, matches the charge of the POM anion, q, to provide an uncharged complex. In aspects where at least one monatomic counter cation is included, however, the number of charges given by counter cations will concomitantly be decreased. In certain embodiments, the charges of the POM anion and the counter cation will not add up to zero and the complex will be charged. The number of counter cations can vary, typically from 1 to 20, or from 2 to 10, and may be represented by j, for example:

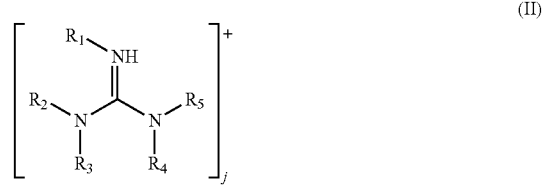

(II)

(III)

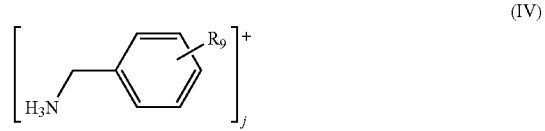

(IV)

Some exemplary polyoxometalate and counter cation complexes include for example and without limitation, $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

In certain embodiments, the polyoxometalate complex comprises a counter cation complexed with a polyoxometalate derivative anion, wherein the polyoxometalate derivative anion is of the general formula (V):

wherein: X' is a heteroatom selected from Si, B, P, Ge, or As;
z is from 3 to 6;
M" is W, Ta, Nb, or Mo;
X" is a heteroatom or group containing a heteroatom, selected from Si—O—Si, P, Ge, Ti, Sn, or As;
p is from 1 to 2, wherein when X" is Si—O—Si p is 2 and one L is bound to each Si atom;
L is of formula (VI), an alkylamine group, an alkylguanidine group, an alicyclic group, an aliphatic group, or an aryl group;

wherein:
$R_{10}$ is an alkylene group and $R_{11}$ and $R_{12}$ are independently selected from H, an alkyl group, an alkenyl group, an alkylamine group, an amide group, an imine group, a heterocyclic group, an aryl group, or an alicyclic group; and
the counter cation is one or more of formula (VII), of formula (VIII), of formula (IX), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

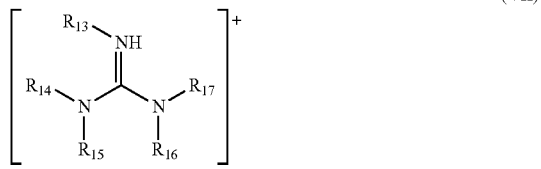

wherein:
$R_{13}$ through $R_{17}$ are independently selected from H, an alkyl group, an alicyclic group, an alkenyl group, and an aryl group, with the proviso that fewer than all of $R_{13}$ through $R_{17}$ are H; or $R_{13}$ through $R_{15}$ are independently selected from H, an alkyl group, an alicyclic group, an alkenyl group, and an aryl group, and $R_{16}$ and $R_{17}$ taken together with the N to which they are both bonded form a heterocyclic ring;

wherein:
$R_{18}$ is H, an alkyl group, an alkylamine group, or an alicyclic group; $R_{19}$ is an alkyl group or an alkylamine group; $R_{20}$ and $R_{21}$ are independently selected from H and an alkyl group; and

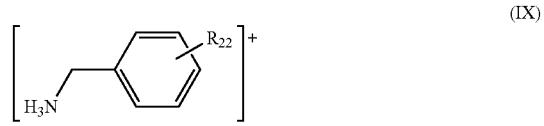

wherein $R_{22}$ is C≡N, an alkoxy group, an alkyl group, an alkenyl group, or an aryl group; with the proviso that if L is an alicyclic group, an aliphatic group, or an aryl group then the counter cation contains a protonated amine group, wherein L is bonded to X" through a carbon atom.

The one or more early transition metal optionally includes M" as being tungsten (W), tantalum (Ta), niobium (Nb), or molybdenum (Mo). The heteroatom, X' is typically silicon (Si), boron (B), phosphorous (P), germanium (Ge), or Arsenic (As). In certain embodiments, X" is Si—O—Si, P, Ge, titanium (Ti), tin (Sn), or As. The negative charge, z, of the polyoxometalate derivative anion is from 3 to 6, such as 3, 4, or 5. Typically, the number of charges given by counter cations matches the charge of the POM derivative anion, z, to provide an uncharged complex. In aspects where at least one monatomic counter cationic is included, however, the number of charges given by the counter cations will concomitantly be decreased. In certain embodiments, the charges of the POM derivative anion and the counter cation will not add up to zero and the complex will be charged. The number of counter cations can vary, typically from 3 to 6, and may be represented by j, for example:

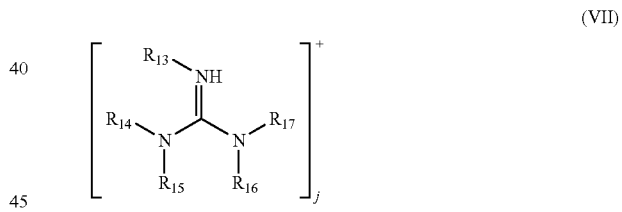

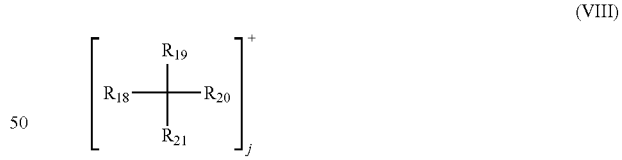

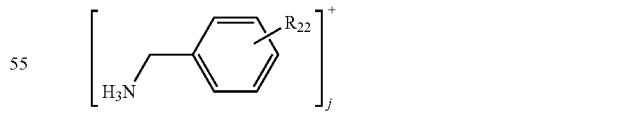

Advantageously, the inclusion of organic groups bound to the X" may further enhance the stability of POM in the polymer. In one particular aspect, X" is Si—O—Si, L is propylamine, the cation is $[CH_3NHCNH_2NH_2]^+$, z is 3, and X' is P. In another aspect, X" is Si—O—Si, L is butyl, the cation is $[CH_3NHCNH_2NH_2]^+$, z is 4, and X' is Si.

In certain aspects of a lacunary polyoxometalate derivative, $R_{11}$ and $R_{12}$ are each H and $R_{10}$ is an alkylene group, and optionally the early transition metal, M, is W.

In a particular aspect, L is propylguanidine hydrochloride, the cation is tetrabutylammonium, z is 3, X" is Si—O—Si, and X' is P. In another aspect, L is propylguanidine hydrochloride, the cation is potassium, z is 4, X" is Si—O—Si, and X' is Si. In a further aspect, L is propylamine, the cation is tetrabutylammonium, z is 3, X" is Si—O—Si, and X' is P. In an additional aspect, L is butylamine, the cation is potassium, z is 4, X" is Si—O—Si, and X' is Si. In a still further aspect, L is N-(2-aminoethyl)-3-aminopropyl, the cation is potassium, z is 4, X" is Si—O—Si, and X' is Si. In yet another aspect, L is butyl, the cation is methylguanidinium, z is 4, X" is Si—O—Si, and X' is Si. In an additional specific aspect, L is propylamine, the cation is potassium, z is 4, X" is Si—O—Si, and X' is Si. When the counter cation is a monatomic cation, it is preferably selected from sodium, potassium, and lithium.

In certain embodiments, the POM particles are contained in only a portion of the article to impart photochromism to one or more select areas of the photochromic article. To maximize even photochromic properties throughout the article, the POM and counter cation complex (i.e., polyoxometalate and counter cation complex) is preferably homogeneously distributed in the structural component.

The proportion (or stated differently as concentration or amount) of polyoxometalate complex provided in the articles is not particularly limited, although certain amounts are preferred. The articles include at least 5% by weight of the POM and counter cation complex, at least 10% by weight, at least 15% by weight, at least 20% by weight, or even at least 25% by weight of the POM complex. The articles include up to 30% by weight of the POM complex, up to 40% by weight, up to 50% by weight, up to 60% by weight, up to 70% by weight, or up to 80% by weight, or even up to 90% by weight of the POM complex. For instance, an article comprises 5% by weight to 90% by weight of the POM complex, or 10% by weight to 50% by weight of the POM complex, or even 15% by weight to 30% by weight of the POM complex. If the amount of POM complex in the article is too low, the article will not exhibit sufficient photochromism. If the amount of POM complex in the article is too high, the POM complex could precipitate large crystals or hinder the fluidity of the fluid.

POM complex particles can be obtained from dissolved POM clusters by drying (e.g., evaporation, spray drying, lyophilization) of a POM anion or POM derivative anion and a counter cation containing solution, followed by grinding or dispersing the solid residue, or by precipitation or crystallization from a POM anion or POM derivative anion and a counter cation containing solution and collection of the resulting solid by filtration. The selection of the counter cation can determine the ultimate solubility of a POM complex in a given fluid as well as determine the photochromic activity of the POM complex. The articles disclosed herein may not only comprise one type of POM complex, but rather at least one, two, three, four, five, or six or more POM complexes of different chemical formulae. POM complexes can be produced according to processes described in the prior art and known to the skilled person. Examples of how to produce POM complexes are given in the Example section below.

In certain embodiments, a suitable molecular size of a POM anion is from about 0.5 to about 5 nm; with a molecular weight: from about 800 to about 10,000 g/mol. A molecular size within this range can be beneficial in particular to provide a highly translucent material. Suitable particle size ranges for POM complex particles is from about 5 nm to about 50 µm, from about 7.5 nm to about 25 µm, or from about 10 nm to 10 µm. Typically, the density of the POM complex particles ranges from about 1 g/cm$^3$ to about 5 g/cm$^3$ or from about 1.5 g/cm$^3$ to about 2.5 g/cm$^3$. The shape of the POM complex particles is not particularly limited, and can be for instance, cylindrical, platelet, spherical, prolate ellipsoid, oblate ellipsoid, needle-like, polyhedral or irregular.

In many embodiments, the transparent photochromic article is selected from a window, a film, a corrective lens, a display cover layer, a window glazing, a decal, a sticker, a tattoo, a card, a label, an information display, a banner, or a combination thereof.

As noted, the disclosure related to the first aspect also relates to the below second, third and fourth aspects, for instance with respect to suitable materials, component configurations, etc.

In a second aspect, the present disclosure provides a method of forming a photochromic article. The method includes distributing a polyoxometalate complex in a fluid supporting the fluid with a support structure. The polyoxometalate comprises a counter cation complexed with either a polyoxometalate anion or a polyoxometalate derivative anion.

In certain embodiments, the structural component comprises a porous material and placing the fluid in contact with the structural component comprises infusing (e.g., imbibing) the fluid into the porous polymeric material. In certain embodiments, the structural component comprises a plurality of cavities, wherein at least one of the cavities is a channel, and placing the fluid in contact with the structural component comprises at least partially filling the channel. In certain embodiments, the structural component comprises a plurality of interior cavities, and placing the fluid in contact with the structural component comprises at least partially filling at least a portion of the interior cavities with the fluid.

In any of the embodiments, the method optionally further comprises disposing an oxygen-permeable material on the structural component, attaching a transparent substrate to a major surface of the structural component, applying a layer to a major surface of the structural component, attaching an adhesive to a major surface of the structural component, attaching a polymer film layer to a major surface of the structural component, attaching a frame to a major surface of the structural component, or any combination thereof. By "attaching to a major surface of the structural component", it is to be understood that in certain embodiments there is optionally one or more layers of other materials between the attached material and the structural component rather than necessarily being directly attached (or coated, etc.).

In a third aspect, the present disclosure provides a method of changing a light transmission of a photochromic article. The method includes providing a photochromic article and exposing the photochromic article to light wavelengths of 300 nm to 400 nm for a time of at least 2 minutes such that the article exhibits a difference in transmission of at least 1%, or at least 2%, or at least 5%. The photochromic article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous material, a plurality of cavities, or both. The article is photochromic. The method of changing a light transmission is particularly useful for applications in which light wavelengths will travel from one major surface of the photochromic article through the opposing major surface of the photochromic article.

In certain embodiments, the time of exposing is at least 4 minutes, or at least 5 minutes, or at least 6 minutes, or at least 8 minutes, or at least 10 minutes, or at least 12 minutes, or at least 15 minutes, or at least 20 minutes, or at least 30 minutes, or at least 45 minutes, or at least 60 minutes. Typically, the method further comprises ceasing the exposing to the light wavelengths for at least 4 minutes such that the article exhibits a difference in transmission of at least 1%, or at least 2%, or at least 5%. The time of ceasing the exposing to the light wavelengths is optionally at least 5 minutes, or at least 8 minutes, or at least 10 minutes, or at least 15 minutes, or at least 20 minutes, or at least 30 minutes, or at least 45 minutes, or at least 60 minutes, or at least 90 minutes. Moreover, in some embodiments the method further comprises cycling between the exposing the photochromic article to the light wavelengths and the ceasing exposing the photochromic article to the light wavelengths, wherein the cycling comprises at least two cycles of each of the exposing the photochromic article to the light wavelengths and the ceasing the exposing the photochromic article to the light wavelengths and alternating between the exposing and the ceasing the exposing. Advantageously, the photochromic article often exhibits the difference in transmission following each cycle for at least 20 cycles, or at least 50 cycles, or at least 100 cycles, or at least 250 cycles, or at least 500 cycles, or at least 1,000 cycles. Although the difference in transmission may decline gradually over time during cycling, it remains at least a specific percentage for a minimum number of cycles.

In a fourth aspect, the present disclosure provides a method of changing a light reflection of a photochromic article. The method includes providing a photochromic article and exposing the photochromic article to light wavelengths of 300 nm to 400 nm for a time of at least 2 minutes such that a reflection of the article on a surface exhibits a difference in reflectance of at least 1%, or at least 2%, or at least 5%. The photochromic article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component includes a porous polymeric material, a plurality of cavities, or both. The article is photochromic. The method of changing a light reflection is particularly useful for applications such as labels, indicators, graphics, and apparel.

In certain embodiments, the time of exposing is at least 4 minutes, or at least 5 minutes, or at least 6 minutes, or at least 8 minutes, or at least 10 minutes, or at least 12 minutes, or at least 15 minutes, or at least 20 minutes, or at least 30 minutes, or at least 45 minutes, or at least 60 minutes. Typically, the method further comprises ceasing the exposing to the light wavelengths for at least 4 minutes such that the article exhibits a difference in reflectance of at least 2%, or at least 5%. The time of ceasing the exposing to the light wavelengths is optionally at least 5 minutes, or at least 8 minutes, or at least 10 minutes, or at least 15 minutes, or at least 20 minutes, or at least 30 minutes, or at least 45 minutes, or at least 60 minutes, or at least 90 minutes.

Moreover, in some embodiments the method further comprises cycling between the exposing the photochromic article to the light wavelengths and the ceasing exposing the photochromic article to the light wavelengths, wherein the cycling comprises at least two cycles of each of the exposing the photochromic article to the light wavelengths and the ceasing the exposing the photochromic article to the light wavelengths and alternating between the exposing and the ceasing the exposing. Advantageously, in certain embodiments the photochromic article exhibits the difference in reflectance following each cycle for at least 20 cycles, or at least 50 cycles, or at least 100 cycles, or at least 250 cycles, or at least 500 cycles, or at least 1,000 cycles.

In a fifth aspect, the present disclosure provides a reflective photochromic article, for example a diffusely reflective photochromic article. The article contains a structural component, a fluid in contact with the structural component, and a polyoxometalate complex in contact with the fluid. The polyoxometalate complex includes a counter cation complexed with either a polyoxometalate anion or a polyoxometalate derivative anion. The structural component and fluid in contact with the structural component may be reflective, for example diffusely reflective. Alternatively, the article further comprises a reflective layer, for example a diffusely reflective layer.

Optionally, the reflective photochromic is opaque (i.e., not transparent), for example with visible light transmission less than 2%, less than 1%, less than 0.5%, or even less than 0.1%. The (e.g., diffusely) reflective photochromic article may exhibit a dynamic range of visible light reflectance of at least 2%, at least 5%, at least 10%, at least 15%, at least 20%, at least 25%, at least 30%, from 2% to 99%, from 5% to 90%, from 10% to 75%, from 15% to 60%, or from 25% to 50%. In its colored (darkened) state the reflective photochromic article may have a (e.g., diffuse) reflectance of between, for example, 0% and 75%, between 1% and 50%, or between 5% and 25%. In its non-colored (bleached) state, the reflective photochromic article may have a (e.g., diffuse) reflectance of between, for example, 25% and 99%, between 50% and 95%, or between 75% and 90%.

Figure 14:
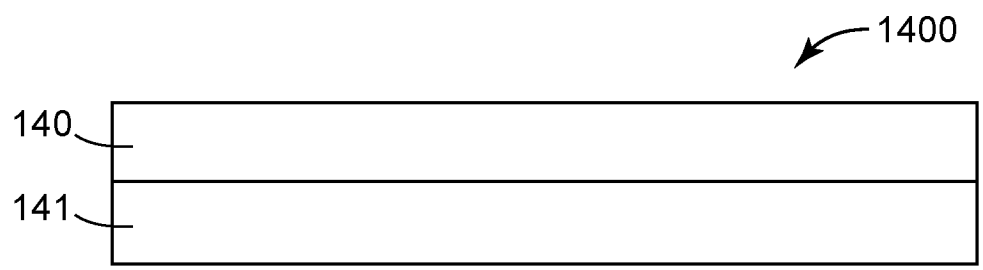
FIG. 14 is a schematic cross-sectional view of an exemplary reflective photochromic article according to the disclosure.

Referring to FIG. 14, a schematic cross-sectional view of a reflective photochromic article is provided. The reflective photochromic article 1400 contains a photochromic layer 140 according to any of articles 100, 200, 300, 400, 500, 600, 700, 800, 900, 1100, 1200, or 1300. The article further contains a reflective layer 141. The reflective layer 141 may be diffusely reflecting. Examples of useful reflective layers 141 include paper, pigmented films or coatings, and porous films or coatings. The article 1400 may be transparent or opaque, for example opaque with visible light transmission less than 2%, less than 1%, less than 0.5%, or even less than 0.1%. The photochromic layer 140 may be adjacent to the reflective layer 141 or it may be spaced apart from the reflective layer 141, for example spaced apart by air or by a material, preferably a transparent material.

Figure 15:
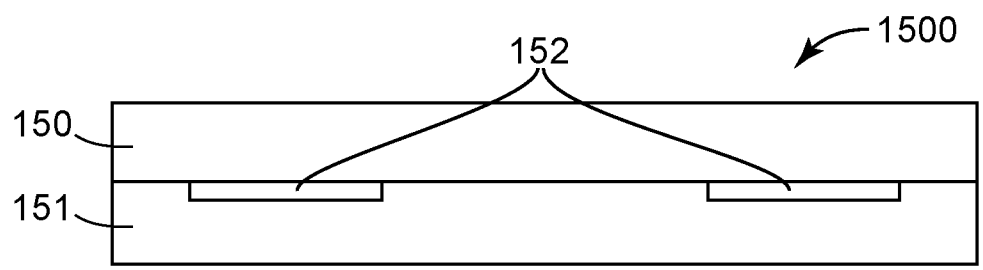
FIG. 15 is a schematic cross-sectional view of another exemplary reflective photochromic article according to the disclosure.

Referring to FIG. 15, a schematic cross-sectional view of a reflective photochromic article is provided. The reflective photochromic article 1500 contains a photochromic layer 150 according to any of articles 100, 200, 300, 400, 500, 600, 700, 800, 900, 1100, 1200, or 1300. The article further contains a reflective layer 151. The reflective layer 151 may be diffusely reflecting. Examples of useful reflective layers 151 include paper, pigmented films or coatings, and porous films or coatings. The article 1500 may be transparent or opaque, for example opaque with visible light transmission less than 2%, less than 1%, less than 0.5%, or even less than 0.1%. The photochromic layer 150 may be adjacent to the reflective layer 151 or it may be spaced apart from the reflective layer 151, for example spaced apart by air or by a material, preferably a transparent material. The article 1500 includes a graphic 152. The graphic may comprise one or more black, gray, or colored inks in a pattern or patterns. FIG. 15 indicates the graphic to be interposed between the photochromic layer 150 and the reflective layer 151. Alternatively, the photochromic layer may be interposed between the graphic and the reflective layer. Alternatively, the reflective layer and the graphic may be integrated as a unitary layer. Examples of graphics patterns include polygonal or non-polygonal shapes or other indicia such as one or more of alphanumeric characters, numbers, trademarks, logos, official seals, or images.

Figure 16:
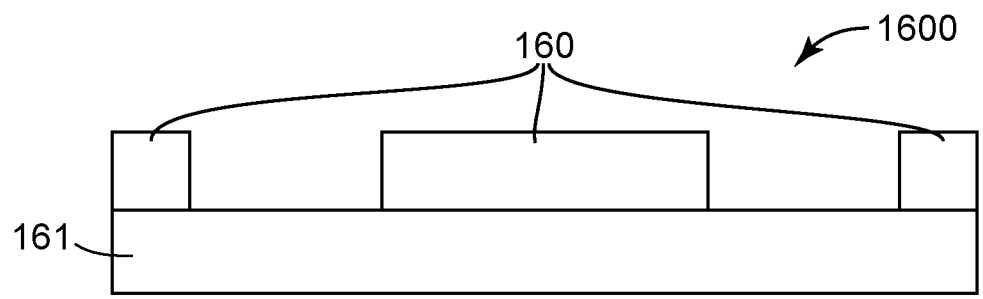
FIG. 16 is a schematic cross-sectional view of a further exemplary reflective photochromic article according to the disclosure.

Referring to FIG. 16, a schematic cross-sectional view of a reflective photochromic article is provided. The reflective photochromic article 1600 contains a patterned photochromic layer 160 according to any of articles 100, 200, 300, 400, 500, 600, 700, 800, 900, 1100, 1200, or 1300. The article further contains a reflective layer 161. The reflective layer 161 may be diffusely reflecting. Examples of useful reflective layers 161 include paper, pigmented films or coatings, and porous films or coatings. The article 1600 may be transparent or opaque, for example opaque with visible light transmission less than 2%, less than 1%, less than 0.5%, or even less than 0.1%. The photochromic layer 160 may be adjacent to the reflective layer 161 or it may be spaced apart from the reflective layer 161, for example spaced apart by air or by a material, preferably a transparent material. The article 1600 includes a patterned photochromic layer 160. The pattern may include, for example, polygonal or non-polygonal shapes or other indicia such as one or more of alphanumeric characters, numbers, trademarks, logos, official seals, or images.

EXEMPLARY EMBODIMENTS

Embodiment 1 is a photochromic article comprising:

a structural component, wherein the structural component comprises a porous material, a plurality of cavities, or a combination thereof;

a fluid in contact with the structural component; and a polyoxometalate complex comprising a counter cation complexed with either a polyoxometalate anion or a polyoxometalate derivative anion, wherein the polyoxometalate complex is in contact with the fluid, and wherein the article is photochromic.

Embodiment 2 is the photochromic article of embodiment 1, wherein at least a portion of the polyoxometalate complex is dissolved or dispersed in the fluid.

Embodiment 3 is the photochromic article of embodiment 1, wherein at least a portion of the polyoxometalate complex is bound to the structural component.

Embodiment 4 is the photochromic article of any of embodiments 1 to 3, wherein the article exhibits a difference in transmission of at least 1%, or at least 2%, or at least 5%, or at least 7%, or at least 10%, after exposure to light wavelengths of 300 nm to 400 nm for a time of at least 2 minutes.

Embodiment 5 is the photochromic article of any of embodiments 1 to 4, wherein the photochromic article comprises a light transmission of at least 2%.

Embodiment 6 is the photochromic article of any of embodiments 1 to 5, wherein the photochromic article comprises a light transmission of at least 5%.

Embodiment 7 is the photochromic article of any of embodiments 1 to 6, wherein the photochromic article comprises a light transmission of up to 90%.

Embodiment 8 is the photochromic article of any of embodiments 1 to 7, wherein the photochromic article comprises a light transmission of up to 70%.

Embodiment 9 is the photochromic article of any of embodiments 1 to 3, wherein the article exhibits a difference in reflectance of at least 2%, or at least 5%, or at least 7%, or at least 10%, after exposure to light wavelengths of 300 nm to 400 nm for a time of at least 2 minutes.

Embodiment 10 is the photochromic article of embodiment 9, wherein the photochromic article comprises a light transmission of between 50% and 10%.

Embodiment 11 is the photochromic article of embodiment 9 or embodiment 10, wherein the photochromic article comprises a light transmission of between 10% and 2%.

Embodiment 12 is the photochromic article of any of embodiments 9 to 11, wherein the polyoxometalate complex is patterned on the structural component in the form a graphic selected from a logo, a trademark, a picture, at least one alphanumeric character, an insignia, or a plurality of indicia.

Embodiment 13 is the photochromic article of any of embodiments 1 to 12, wherein the photochromic article comprises a haze of up to 20%.

Embodiment 14 is the photochromic article of any of embodiments 1 to 13, wherein the photochromic article comprises a haze of up to 5%.

Embodiment 15 is the photochromic article of any of embodiments 1 to 14, wherein the structural component comprises a porous polymeric material.

Embodiment 16 is the photochromic article of embodiment 15, wherein the porous polymeric material comprises a microporous film, a mesoporous film, a macroporous film, or a combination thereof.

Embodiment 17 is the photochromic article of embodiment 15 or embodiment 16 wherein the porous polymeric material comprises an aliphatic polyurethane, an acrylic, a polyester, a polyimide, a polyamide, an epoxy polymer, a polystyrene, a silicone containing polymer, a fluorinated polymer, or a combination thereof.

Embodiment 18 is the photochromic article of any of embodiments 1 to 14, wherein the structural component comprises a plurality of cavities, wherein at least one of the cavities is a channel, and wherein the fluid at least partially fills the channel.

Embodiment 19 is the photochromic article of embodiment 18, wherein the structural component comprises a plurality of interior cavities, wherein the fluid at least partially fills at least a portion of the interior cavities.

Embodiment 20 is the photochromic article of embodiment 18 or embodiment 19, wherein the structural component comprises an embossed polymer, a molded polymer, or a combination thereof.

Embodiment 21 is the photochromic article of any of embodiments 1 to 20, further comprising a transparent substrate disposed on a first major surface of the structural component, wherein the transparent substrate comprises a glass, polycarbonate, PET, PMMA, or a combination thereof.

Embodiment 22 is the photochromic article of any of embodiments 1 to 21, further comprising a layer disposed on a second major surface of the structural component, the layer comprising an oxygen-permeable material.

Embodiment 23 is the photochromic article of any of embodiments 1 to 22, further comprising a frame attached to the first major surface or the second major surface of the structural component.

Embodiment 24 is the photochromic article of any of embodiments 1 to 23, wherein the fluid comprises a solvent having a boiling point of 150 degrees Celsius or higher, a polyalkylene oxide, an ionic liquid, a plasticizer, or a combination thereof.

Embodiment 25 is the photochromic article of embodiment 24, wherein the polyalkylene oxide comprises polyethylene glycol having a molecular weight less than or equal to 600 grams per mole.

Embodiment 26 is the photochromic article of embodiment 24 or embodiment 25, wherein the fluid comprises a high boiling point solvent selected from N,N-dimethylformamide, hexamethylphosphoramide, 1-methyl-2-pyrrolidinone, dimethylsulfoxide, dimethylacetamide, or a combination thereof.

Embodiment 27 is the photochromic article of embodiment 24, wherein the fluid is a component of a gel comprising a crosslinked polyalkylene oxide.

Embodiment 28 is the photochromic article of any of embodiments 1 to 27, wherein at least a portion of the polyoxometalate complex is dissolved in the fluid.

Embodiment 29 is the photochromic article of any of embodiments 1 to 27, wherein at least a portion of the polyoxometalate complex is dispersed in the fluid.

Embodiment 30 is the photochromic article of any of embodiments 1 to 29, wherein the fluid comprises a solvent that does not participate stoichiometrically in a photochromic redox reaction of the polyoxometalate complex.

Embodiment 31 is the photochromic article of any of embodiments 1 to 30, wherein the article is selected from a window, a film, a corrective lens, a display cover layer, a window glazing, a decal, a sticker, a tattoo, a card, a label, an information display, a banner, or a combination thereof.

Embodiment 32 is the photochromic article of any of embodiments 1 to 31, wherein the polyoxometalate complex comprises a counter cation complexed with a polyoxometalate anion.

Embodiment 33 is the photochromic article of any of embodiments 1 to 31, wherein the polyoxometalate complex comprises a counter cation complexed with a polyoxometalate derivative anion.

Embodiment 34 is the photochromic article of any of embodiments 1 to 32, wherein the polyoxometalate complex comprises a counter cation complexed with a polyoxometalate anion, wherein the polyoxometalate anion is of formula (I):

$$(X_xM_mM'_nO_y)^{q-} \quad (I)$$

wherein:
X is a heteroatom selected from Cu, Zn, Co, Fe, B, Ga, Rh, Al, Cr, Mn, Ni, Ti, Zr, Si, Ge, P, As, Te, or I;
x is from 0 to 30;
m is from 3 to 248;
n is from 0 to m/2, with the proviso that (0≤x<m+n);
y is from 10 to 720;
q is from 1 to 20;
M and M' are early transition metals independently selected from V, Nb, Ta, Mo or W; and
O is oxygen; and
the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

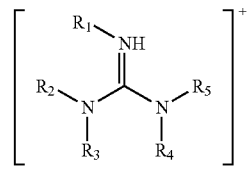

wherein:
$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

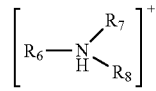

wherein:
$R_6$ is H, an alkyl group, an alkylamine group, or an alicyclic group; $R_7$ is an alkyl group or an alkylamine group; $R_8$ is H or an alkyl group; and

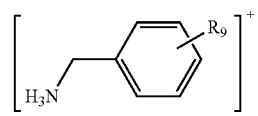

wherein $R_9$ is C≡N, an alkoxy group, an alkyl group, an alkenyl group, or an aryl group; and
the polyoxometalate complex optionally includes at least one monatomic counter cation.

Embodiment 35 is the photochromic article of any of embodiments 1 to 32 or 34, wherein the polyoxometalate anion comprises a Keggin structure.

Embodiment 36 is the photochromic article of any of embodiments 1 to 32 or 34, wherein the polyoxometalate anion comprises a Wells-Dawson structure.

Embodiment 37 is the photochromic article of any of embodiments 34 to 36 wherein M or M' is W or Mo.

Embodiment 38 is the photochromic article of any of embodiments 34 to 37, wherein M or M' is W.

Embodiment 39 is the photochromic article of any of embodiments 34 to 38, wherein X is Si, B, P, or Ge.

Embodiment 40 is the photochromic article of any of embodiments 34 to 39 wherein X is Si.

Embodiment 41 is the photochromic article of any of embodiments 34 to 39, wherein X is B.

Embodiment 42 is the photochromic article of any of embodiments 34 to 39, wherein X is P.

Embodiment 43 is the photochromic article of any of embodiments 34 to 39, wherein X is Ge.

Embodiment 44 is the photochromic article of any of embodiments 34 to 43, wherein m is from 3 to 18.

Embodiment 45 is the photochromic article of any of embodiments 34 to 44, wherein y is from 10 to 62.

Embodiment 46 is the photochromic article of any of embodiments 34 to 45 wherein q is from 2 to 10.

Embodiment 47 is the photochromic article of any of embodiments 1 to 32 or 34 to 38, wherein the polyoxometalate complex comprises $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3$ $[PW_{12}O_{40}]$, $(CH_3NHCNH_2NH_2)_5$ $[BW_{12}O_{40}]$, $(CH_3NHCNH_2NH_2)_4[SiW_{12}O_{40}]$, or a combination thereof.

Embodiment 48 is the photochromic article of any of embodiments 1 to 32 or 34 to 38, wherein the polyoxometalate complex comprises $(CH_3NHCNH_2NH_2)_3[PW_{12}O_{40}]$, $(CH_3NHCNH_2NH_2)_5[BW_{12}O_{40}]$, $(CH_3NHCNH_2NH_2)_4$ $[SiW_{12}O_{40}]$, or a combination thereof.

Embodiment 49 is the photochromic article of any of embodiments 1 to 32 or 34 to 38, wherein the polyoxometalate complex comprises $(CH_3CH_2NHCNH_2NH_2)_3$ $[PW_{12}O_{40}]$.

Embodiment 50 is the photochromic article of any of embodiments 1 to 32 or 34 to 38, wherein the polyoxometalate complex comprises $((CH_3)_2NCNH_2NH_2)_3[PW_{12}O_{40}]$.

Embodiment 51 is the photochromic article of any of embodiments 1 to 31 or 33, wherein the polyoxometalate complex comprises a counter cation complexed with a polyoxometalate derivative anion, wherein the polyoxometalate derivative anion is of the general formula (V):

$$[X'M''_{11}O_{39}(X''L_p)]^{z-} \quad (V)$$

wherein: X' is a heteroatom selected from Si, B, P, Ge, or As; z is from 3 to 6;
M'' is W, Ta, Nb, or Mo;
X'' is a heteroatom or group containing a heteroatom, selected from Si—O—Si, P, Ge, Ti, Sn, or As;
p is from 1 to 2, wherein when X'' is Si—O—Si p is 2 and one L is bound to each Si atom;
L is of formula (VI), an alkylamine group, an alkylguanidine group, an alicyclic group, an aliphatic group, or an aryl group;

(VI)

wherein:
$R_{10}$ is an alkylene group and $R_{11}$ and $R_{12}$ are independently selected from H, an alkyl group, an alkenyl group, an alkylamine group, an amide group, an imine group, a heterocyclic group, an aryl group, or an alicyclic group; and the counter cation is one or more of formula (VII), of formula (VIII), of formula (IX), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

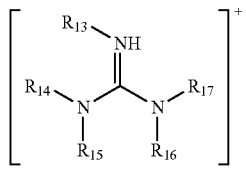

(VII)

wherein:
$R_{13}$ through $R_{17}$ are independently selected from H, an alkyl group, an alicyclic group, an alkenyl group, and an aryl group, with the proviso that fewer than all of $R_{13}$ through $R_{17}$ are H; or $R_{13}$ through $R_{15}$ are independently selected from H, an alkyl group, an alicyclic group, an alkenyl group, and an aryl group, and $R_{16}$ and $R_{17}$ taken together with the N to which they are both bonded form a heterocyclic ring;

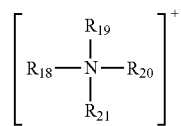

(VIII)

wherein:
$R_{18}$ is H, an alkyl group, an alkylamine group, or an alicyclic group; $R_{19}$ is an alkyl group or an alkylamine group; $R_{20}$ and $R_{21}$ are independently selected from H and an alkyl group; and

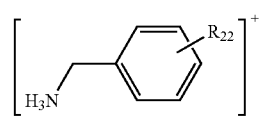

(IX)

wherein $R_n$ is C≡N, an alkoxy group, an alkyl group, an alkenyl group, or an aryl group;
with the proviso that if L is an alicyclic group, an aliphatic group, or an aryl group then the counter cation contains a protonated amine group, wherein L is bonded to X'' through a carbon atom.

Embodiment 52 is the photochromic article of embodiment 51, wherein p is 2.

Embodiment 53 is the photochromic article of embodiment 51 or embodiment 52, wherein M'' is W or Mo.

Embodiment 54 is the photochromic article of any of embodiments 51 to 53, wherein M'' is W.

Embodiment 55 is the photochromic article of any of embodiments 51 to 54, wherein X' is Si, B, P, or Ge.

Embodiment 56 is the photochromic article of any of embodiments 51 to 55, wherein X' is Si.

Embodiment 57 is the photochromic article of any of embodiments 51 to 55, wherein X' is B.

Embodiment 58 is the photochromic article of any of embodiments 51 to 55, wherein X' is P.

Embodiment 59 is the photochromic article of any of embodiments 51 to 55, wherein X' is Ge.

Embodiment 60 is the photochromic article of any of embodiments 51 to 59, wherein X'' is selected from Si—O—Si, P, Ge, Ti, Sn, and As.

Embodiment 61 is the photochromic article of any of embodiments 51 to 60, wherein X'' is Si—O—Si.

Embodiment 62 is the photochromic article of any of embodiments 51 to 60, wherein
X'' is P.

Embodiment 63 is the photochromic article of any of embodiments 51 to 60, wherein X'' is Ge.

Embodiment 64 is the photochromic article of any of embodiments 51 to 60, wherein X'' is Ti.

Embodiment 65 is the photochromic article of any of embodiments 51 to 60, wherein X'' is Sn.

Embodiment 66 is the photochromic article of any of embodiments 51 to 60, wherein X" is As.

Embodiment 67 is the photochromic article of any of embodiments 51 to 66, wherein z is 3.

Embodiment 68 is the photochromic article of any of embodiments 51 to 66, wherein z is 4.

Embodiment 69 is the photochromic article of any of embodiments 51 to 66, wherein z is 5.

Embodiment 70 is the photochromic article of any of embodiments 51 to 54, wherein L is propylguanidine hydrochloride, the cation is tetrabutylammonium, z is 3, X" is Si—O—Si, and X' is P.

Embodiment 71 is the photochromic article of any of embodiments 51 to 54, wherein L is propylguanidine hydrochloride, the cation is potassium, z is 4, X" is Si—O—Si, and X' is Si.

Embodiment 72 is the photochromic article of any of embodiments 51 to 54, wherein L is propylamine, the cation is tetrabutylammonium, z is 3, X" is Si—O—Si, and X' is P.

Embodiment 73 is the photochromic article of any of embodiments 51 to 54, wherein L is butylamine, the cation is potassium, z is 4, X" is Si—O—Si, and X' is Si.

Embodiment 74 is the photochromic article of any of embodiments 51 to 54, wherein L is N-(2-aminoethyl)-3-aminopropyl, the cation is potassium, z is 4, X" is Si—O—Si, and X' is Si.

Embodiment 75 is the photochromic article of any of embodiments 51 to 54, wherein L is butyl, the cation is methylguanidinium, z is 4, X" is Si—O—Si, and X' is Si.

Embodiment 76 is the photochromic article of any of embodiments 51 to 54, wherein L is propylamine, the cation is potassium, z is 4, X" is Si—O—Si, and X' is Si.

Embodiment 77 is the photochromic article of any of embodiments 51 to 54, wherein L is propylamine, the cation is $[CH_3NHCNH_2NH_2]^+$, z is 3, and X' is P.

Embodiment 78 is the photochromic article of any of embodiments 51 to 54, wherein L is butyl, the cation is $[CH_3NHCNH_2NH_2]^+$, z is 4, and X' is Si.

Embodiment 79 is the photochromic article of any of embodiments 51 to 54, wherein the cation is a monatomic cation selected from sodium, potassium, and lithium.

Embodiment 80 is a method of forming a photochromic article comprising:
distributing a polyoxometalate complex in a fluid, the polyoxometalate complex comprising a counter cation complexed with either a polyoxometalate anion or a polyoxometalate derivative anion; and
placing the fluid in contact with a structural component, wherein the structural component comprises a porous material, a plurality of cavities, or a combination thereof,
wherein the article is photochromic.

Embodiment 81 is the method of embodiment 80, wherein the structural component comprises a porous polymeric material and placing the fluid in contact with the structural component comprises infusing the fluid into the porous polymeric material.

Embodiment 82 is the method of embodiment 81, wherein the porous polymeric material comprises a microporous film, a mesoporous film, a macroporous film, or a combination thereof.

Embodiment 83 is the method of embodiment 81 or embodiment 82, wherein the porous polymeric material comprises an aliphatic polyurethane, an acrylic, a polyester, a polyimide, a polyamide, an epoxy polymer, a polystyrene, a silicone containing polymer, a fluorinated polymer, or a combination thereof.

Embodiment 84 is the method of any of embodiments 80 to 83, wherein the structural component comprises a plurality of cavities, wherein at least one of the cavities is a channel, and placing the fluid in contact with the structural component comprises at least partially filling the channel.

Embodiment 85 is the method of embodiment 80, wherein the structural component comprises a plurality of interior cavities, and placing the fluid in contact with the structural component comprises at least partially filling at least a portion of the interior cavities with the fluid.

Embodiment 86 is the method of embodiment 84 or embodiment 85, wherein the structural component comprises an embossed polymer, a molded polymer, or a combination thereof.

Embodiment 87 is the method of any of embodiments 80 to 86, further comprising disposing a transparent substrate on the structural component, wherein the transparent substrate comprises a glass, polycarbonate, PET, PMMA, or a combination thereof.

Embodiment 88 is the method of any of embodiments 80 to 87, further comprising applying a layer to a second major surface of the structural component, the layer comprising an oxygen-permeable material.

Embodiment 89 is the method of any of embodiments 80 to 88, further comprising attaching a frame to a first major surface or a second major surface of the structural component.

Embodiment 90 is the method of any of embodiments 80 to 89, wherein the fluid comprises a solvent having a boiling point of 150 degrees Celsius or higher, a polyalkylene oxide, an ionic liquid, a plasticizer, or a combination thereof.

Embodiment 91 is the method of embodiment 90, wherein the fluid comprises a polyalkylene glycol.

Embodiment 92 is the method of embodiment 91, wherein the polyalkylene oxide comprises polyethylene glycol having a molecular weight less than or equal to 600 grams per mole.

Embodiment 93 is the method of embodiment 90, wherein the fluid comprises a high boiling point solvent selected from N,N-dimethylformamide, hexamethylphosphoramide, 1-methyl-2-pyrrolidinone, dimethylsulfoxide, dimethylacetamide, or a combination thereof.

Embodiment 94 is the method of embodiment 90, wherein the fluid is a component of a gel comprising a crosslinked polyalkylene oxide.

Embodiment 95 is the method of any of embodiments 80 to 94, wherein at least a portion of the polyoxometalate complex is dissolved in the fluid.

Embodiment 96 is the method of any of embodiments 80 to 94, wherein at least a portion of the polyoxometalate complex is dispersed in the fluid.

Embodiment 97 is the method of any of embodiments 80 to 96, wherein the fluid comprises a solvent that does not participate stoichiometrically in a photochromic redox reaction of the polyoxometalate complex.

Embodiment 98 is the method of any of embodiments 80 to 97, wherein the article is selected from a window, a film, a corrective lens, a display cover layer, a window glazing, a decal, a sticker, a tattoo, a card, a label, an information display, a banner, or a combination thereof.

Embodiment 99 is the method of any of embodiments 80 to 98, wherein the polyoxometalate complex comprises a counter cation complexed with a polyoxometalate anion.

Embodiment 100 is the method of any of embodiments 80 to 98, wherein the polyoxometalate complex comprises a counter cation complexed with a polyoxometalate derivative anion.

Embodiment 101 is a method of changing a light transmission of a photochromic article comprising:
providing a photochromic article comprising:
a structural component, wherein the structural component comprises a porous material, a plurality of cavities, or a combination thereof;
a fluid in contact with the structural component; and
a polyoxometalate complex comprising a counter cation complexed with either a polyoxometalate anion or a polyoxometalate derivative anion, wherein the polyoxometalate complex is in contact with the fluid; and
exposing the photochromic article to light wavelengths of 300 nm to 400 nm for a time of at least 2 minutes such that the article exhibits a difference in transmission of at least 1%, or at least 2%, or at least 5%.

Embodiment 102 is the method of embodiment 101, wherein the time of exposing is at least 4 minutes, or at least 5 minutes, or at least 6 minutes, or at least 8 minutes, or at least 10 minutes, or at least 12 minutes, or at least 15 minutes, or at least 20 minutes, or at least 30 minutes, or at least 45 minutes, or at least 60 minutes.

Embodiment 103 is the method of embodiment 101 or embodiment 102, further comprising ceasing the exposing to the light wavelengths for at least 4 minutes such that the article exhibits a difference in transmission of at least 1%, or at least 2%, or at least 5%.

Embodiment 104 is the method of embodiment 103, wherein the time of ceasing the exposing to the light wavelengths is at least 5 minutes, or at least 8 minutes, or at least 10 minutes, or at least 15 minutes, or at least 20 minutes, or at least 30 minutes, or at least 45 minutes, or at least 60 minutes, or at least 90 minutes.

Embodiment 105 is the method of embodiment 103 or embodiment 104, further comprising cycling between the exposing the photochromic article to the light wavelengths and the ceasing exposing the photochromic article to the light wavelengths, wherein the cycling comprises at least two cycles of each of the exposing the photochromic article to the light wavelengths and the ceasing the exposing the photochromic article to the light wavelengths and alternating between the exposing and the ceasing the exposing.

Embodiment 106 is the method of embodiment 105, wherein the photochromic article exhibits the difference in transmission following each cycle for at least 20 cycles, or at least 50 cycles, or at least 100 cycles, or at least 250 cycles, or at least 500 cycles, or at least 1,000 cycles.

Embodiment 107 is a method of changing a light reflectance of a photochromic article comprising:
providing a photochromic article comprising:
a structural component, wherein the structural component comprises a porous material, a plurality of cavities, or a combination thereof;
a fluid in contact with the structural component; and
a polyoxometalate complex comprising a counter cation complexed with either a polyoxometalate anion or a polyoxometalate derivative anion, wherein the polyoxometalate complex is in contact with the fluid; and
exposing the photochromic article to light wavelengths of 300 nm to 400 nm for a time of at least 2 minutes such that a reflection of the article exhibits a difference in reflectance of at least 2%, or at least 5%.

Embodiment 108 is the method of embodiment 107, wherein the time of exposing is at least 4 minutes, or at least 5 minutes, or at least 6 minutes, or at least 8 minutes, or at least 10 minutes, or at least 12 minutes, or at least 15 minutes, or at least 20 minutes, or at least 30 minutes, or at least 45 minutes, or at least 60 minutes.

Embodiment 109 is the method of embodiment 107 or embodiment 108, further comprising ceasing the exposing to the light wavelengths for at least 4 minutes such that the article exhibits a difference in reflectance of or at least 2%, or at least 5%.

Embodiment 110 is the method of embodiment 109, wherein the time of ceasing the exposing to the light wavelengths is at least 5 minutes, or at least 8 minutes, or at least 10 minutes, or at least 15 minutes, or at least 20 minutes, or at least 30 minutes, or at least 45 minutes, or at least 60 minutes, or at least 90 minutes.

Embodiment 111 is the method of embodiment 109 or embodiment 110, further comprising cycling between the exposing the photochromic article to the light wavelengths and the ceasing exposing the photochromic article to the light wavelengths, wherein the cycling comprises at least two cycles of each of the exposing the photochromic article to the light wavelengths and the ceasing the exposing the photochromic article to the light wavelengths and alternating between the exposing and the ceasing the exposing.

Embodiment 112 is the method of embodiment 111, wherein the photochromic article exhibits the difference in reflectance following each cycle for at least 20 cycles, or at least 50 cycles, or at least 100 cycles, or at least 250 cycles, or at least 500 cycles, or at least 1,000 cycles.

Embodiment 113 is the method of any of embodiments 101 to 112, wherein at least a portion of the polyoxometalate complex is dissolved or dispersed in the fluid.

Embodiment 114 is the method of any of embodiments 101 to 112, wherein at least a portion of the polyoxometalate complex is bound to the structural component.

Embodiment 115 is the method of any of embodiments 101 to 104, 113, or 114, wherein the photochromic article comprises a light transmission of at least 2%.

Embodiment 116 is the method of any of embodiments 101 to 104 or 113 to 115, wherein the photochromic article comprises a light transmission of at least 5%.

Embodiment 117 is the method of any of embodiments 101 to 104 or 113 to 116, wherein the photochromic article comprises a light transmission of up to 90%.

Embodiment 118 is the method of any of embodiments 101 to 104 or 113 to 117, wherein the photochromic article comprises a light transmission of up to 70%.

Embodiment 119 is the method of embodiment 118, wherein the photochromic article comprises a light transmission of between 50% and 10%.

Embodiment 120 is the method of embodiment 118 or embodiment 119, wherein the photochromic article comprises a light transmission of between 10% and 2%.

Embodiment 121 is the method of any of embodiments 101 to 120, wherein the polyoxometalate complex is patterned on the structural component in the form a graphic selected from a logo, a trademark, a picture, at least one alphanumeric character, an insignia, or a plurality of indicia.

Embodiment 122 is the method of any of embodiments 101 to 104 or 113 to 121, wherein the photochromic article comprises a haze of up to 20%.

Embodiment 123 is the method of any of embodiments 101 to 104 or 113 to 123, wherein the photochromic article comprises a haze of up to 5%.

Embodiment 124 is the method of any of embodiments 101 to 124, wherein the structural component comprises a porous polymeric material.

Embodiment 125 is the method of embodiment 124, wherein the porous polymeric material comprises a microporous film, a mesoporous film, a macroporous film, or a combination thereof.

Embodiment 126 is the method of embodiment 124 or embodiment 125 wherein the porous polymeric material comprises an aliphatic polyurethane, an acrylic, a polyester, a polyimide, a polyamide, an epoxy polymer, a polystyrene, a silicone containing polymer, a fluorinated polymer, or a combination thereof.

Embodiment 127 is the method of any of embodiments 101 to 123, wherein the structural component comprises a plurality of cavities, wherein at least one of the cavities is a channel, and wherein the fluid at least partially fills the channel.

Embodiment 128 is the method of embodiment 127, wherein the structural component comprises a plurality of interior cavities, wherein the fluid at least partially fills at least a portion of the interior cavities.

Embodiment 129 is the method of embodiment 127 or embodiment 128, wherein the structural component comprises an embossed polymer, a molded polymer, or a combination thereof.

Embodiment 130 is the method of any of embodiments 101 to 129, further comprising a transparent substrate disposed on a first major surface of the structural component, wherein the transparent substrate comprises a glass, polycarbonate, PET, PPMA, or a combination thereof.

Embodiment 131 is the method of any of embodiments 101 to 130, further comprising a layer disposed on a second major surface of the structural component, the layer comprising an oxygen-permeable material.

Embodiment 132 is the method of any of embodiments 101 to 131, further comprising a frame attached to a first major surface or a second major surface of the structural component.

Embodiment 133 is the method of any of embodiments 101 to 132, wherein the fluid comprises a solvent having a boiling point of 150 degrees Celsius or higher, a polyalkylene oxide, an ionic liquid, a plasticizer, or a combination thereof.

Embodiment 134 is the method of embodiment 133, wherein the polyalkylene oxide comprises polyethylene glycol having a molecular weight less than or equal to 600 grams per mole.

Embodiment 135 is the method of embodiment 133 or embodiment 134, wherein the fluid comprises a high boiling point solvent selected from N,N-dimethylformamide, hexamethylphosphoramide, 1-methyl-2-pyrrolidinone, dimethylsulfoxide, dimethylacetamide, or a combination thereof.

Embodiment 136 is the method of embodiment 133, wherein the fluid is a component of a gel comprising a crosslinked polyalkylene oxide.

Embodiment 137 is the method of any of embodiments 101 to 136, wherein at least a portion of the polyoxometalate complex is dissolved in the fluid.

Embodiment 138 is the method of any of embodiments 101 to 136, wherein at least a portion of the polyoxometalate complex is dispersed in the fluid.

Embodiment 139 is the method of any of embodiments 101 to 138, wherein the fluid comprises a solvent that does not participate stoichiometrically in a photochromic redox reaction of the polyoxometalate complex.

Embodiment 140 is the method of any of embodiments 101 to 139, wherein the article is selected from a window, a film, a corrective lens, a display cover layer, a window glazing, a decal, a sticker, a tattoo, a card, a label, an information display, a banner, or a combination thereof.

Embodiment 141 is the method of any of embodiments 101 to 140, wherein the polyoxometalate complex comprises a counter cation complexed with a polyoxometalate anion.

Embodiment 142 is the method of any of embodiments 101 to 140, wherein the polyoxometalate complex comprises a counter cation complexed with a polyoxometalate derivative anion.

Embodiment 143 is the method of any of embodiments 101 to 141, wherein the polyoxometalate complex comprises a counter cation complexed with a polyoxometalate anion, wherein the polyoxometalate anion is of formula (I):

$(X_xM_mM'_nO_y)^{q-}$     (I)

wherein:

X is a heteroatom selected from Cu, Zn, Co, Fe, B, Ga, Rh, Al, Cr, Mn, Ni, Ti, Zr, Si, Ge, P, As, Te, or I;

x is from 0 to 30;

m is from 3 to 248;

n is from 0 to m/2, with the proviso that (0≤x<m+n);

y is from 10 to 720;

q is from 1 to 20;

M and M' are early transition metals independently selected from V, Nb, Ta, Mo or W; and O is oxygen; and the counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation;

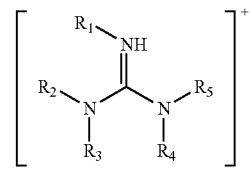

(II)

wherein:

$R_1$ through $R_5$ are independently selected from H, an alkyl group, an alicyclic group, an alkenyl group, and an aryl group, with the proviso that fewer than all of $R_1$ through $R_5$ are H; or $R_1$ through $R_3$ are independently selected from H, an alkyl group, an alicyclic group, an alkenyl group, and an aryl group, and $R_4$ and $R_5$ are combined together with the N to which they are both bonded forming a heterocyclic ring;

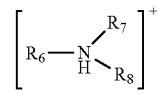

(III)

wherein:

$R_6$ is H, an alkyl group, an alkylamine group, or an alicyclic group; $R_7$ is an alkyl group or an alkylamine group; $R_8$ is H or an alkyl group; and

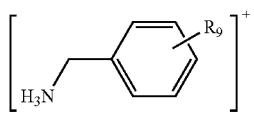
(IV)

wherein $R_9$ is C≡N, an alkoxy group, an alkyl group, an alkenyl group, or an aryl group; and the polyoxometalate complex optionally includes at least one monatomic counter cation.

Embodiment 144 is the method of any of embodiments 101 to 141 or 143, wherein the polyoxometalate anion comprises a Keggin structure.

Embodiment 145 is the method of any of embodiments 101 to 141 or 143, wherein the polyoxometalate anion comprises a Wells-Dawson structure.

Embodiment 146 is the method of any of embodiments 143 to 144, wherein M or M' is W or Mo.

Embodiment 147 is the method of any of embodiments 143 to 145, wherein M or M' is W.

Embodiment 148 is the method of any of embodiments 143 to 147, wherein X is Si, B, P, or Ge.

Embodiment 149 is the method of any of embodiments 143 to 148, wherein X is Si.

Embodiment 150 is the method of any of embodiments 143 to 148, wherein X is B.

Embodiment 151 is the method of any of embodiments 143 to 148, wherein X is P.

Embodiment 152 is the method of any of embodiments 143 to 148, wherein X is Ge.

Embodiment 153 is the method of any of embodiments 143 to 152, wherein m is from 3 to 18.

Embodiment 154 is the method of any of embodiments 143 to 153, wherein y is from 10 to 62.

Embodiment 155 is the method of any of embodiments 143 to 154, wherein q is from 2 to 10.

Embodiment 156 is the method of any of embodiments 101 to 141 or 143 to 147, wherein the polyoxometalate complex comprises $(CH_3NHCNH_2NH_2)_3[PW_{12}O_{40}]$, $(CH_3CH_2NHCNH_2NH_2)_3[PW_{12}O_{40}]$, $((CH_3)_2NCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 157 is the method of any of embodiments 101 to 141 or 143 to 147, wherein the polyoxometalate complex comprises $(CH_3NHCNH_2NH_2)_3[PW_{12}O_{40}]$, $(CH_3NHCNH_2NH_2)_5[BW_{12}O_{40}]$, $(CH_3NHCNH_2NH_2)_4[SiW_{12}O_{40}]$, or a combination thereof.

Embodiment 158 is the method of any of embodiments 101 to 141 or 143 to 147, wherein the polyoxometalate complex comprises $(CH_3CH_2NHCNH_2NH_2)_3[PW_{12}O_{40}]$.

Embodiment 159 is the method of any of embodiments 101 to 141 or 143 to 147, wherein the polyoxometalate complex comprises $((CH_3)_2NCNH_2NH_2)_3[PW_{12}O_{40}]$.

Embodiment 160 is the method of any of embodiments 101 to 140 or 142, wherein the polyoxometalate complex comprises a counter cation complexed with a polyoxometalate derivative anion, wherein the polyoxometalate derivative anion is of the general formula (V):

$[X'M''_{11}O_{39}(X''L_p)]^{z-}$ (V)

wherein: X' is a heteroatom selected from Si, B, P, Ge, or As;
z is from 3 to 6;
M'' is W, Ta, Nb, or Mo;
X'' is a heteroatom or group containing a heteroatom, selected from Si—O—Si, P, Ge, Ti, Sn, or As;

p is from 1 to 2, wherein when X'' is Si—O—Si p is 2 and one L is bound to each Si atom;
L is of formula (VI), an alkylamine group, an alkylguanidine group, an alicyclic group, an aliphatic group, or an aryl group;

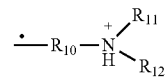
(VI)

wherein:
$R_{10}$ is an alkylene group and $R_{11}$ and $R_{12}$ are independently selected from H, an alkyl group, an alkenyl group, an alkylamine group, an amide group, an imine group, a heterocyclic group, an aryl group, or an alicyclic group; and the counter cation is one or more of formula (VII), of formula (VIII), of formula (IX), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

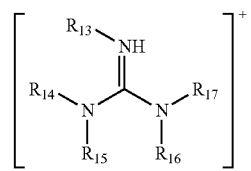
(VII)

wherein:
$R_{13}$ through $R_{17}$ are independently selected from H, an alkyl group, an alicyclic group, an alkenyl group, and an aryl group, with the proviso that fewer than all of $R_{13}$ through $R_{17}$ are H; or $R_{13}$ through $R_{15}$ are independently selected from H, an alkyl group, an alicyclic group, an alkenyl group, and an aryl group, and $R_{16}$ and $R_{17}$ taken together with the N to which they are both bonded form a heterocyclic ring;

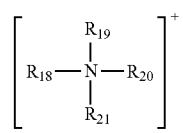
(VIII)

wherein:
$R_{18}$ is H, an alkyl group, an alkylamine group, or an alicyclic group; $R_{19}$ is an alkyl group or an alkylamine group; $R_{20}$ and $R_{21}$ are independently selected from H and an alkyl group; and

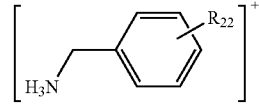
(IX)

wherein $R_{22}$ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X" through a carbon atom.

Embodiment 161 is the method of embodiment 160, wherein p is 2.

Embodiment 162 is the method of embodiment 160 or embodiment 161, wherein M" is W or Mo.

Embodiment 163 is the method of any of embodiments 160 to 162, wherein M" is W.

Embodiment 164 is the method of any of embodiments 160 to 163, wherein X' is Si, B, P, or Ge.

Embodiment 165 is the method of any of embodiments 160 to 164, wherein X' is Si.

Embodiment 166 is the method of any of embodiments 160 to 164, wherein X' is B.

Embodiment 167 is the method of any of embodiments 160 to 164, wherein X' is P.

Embodiment 168 is the method of any of embodiments 160 to 164, wherein X' is Ge.

Embodiment 169 is the method of any of embodiments 160 to 168, wherein X" is selected from Si—O—Si, P, Ge, Ti, Sn, and As.

Embodiment 170 is the method of any of embodiments 160 to 169, wherein X" is Si—O—Si.

Embodiment 171 is the method of any of embodiments 160 to 169, wherein X" is P.

Embodiment 172 is the method of any of embodiments 160 to 169, wherein X" is Ge.

Embodiment 173 is the method of any of embodiments 160 to 169, wherein X" is Ti.

Embodiment 174 is the method of any of embodiments 160 to 169, wherein X" is Sn.

Embodiment 175 is the method of any of embodiments 160 to 169, wherein X" is As.

Embodiment 176 is the method of any of embodiments 160 to 175, wherein z is 3.

Embodiment 177 is the method of any of embodiments 160 to 175, wherein z is 4.

Embodiment 178 is the method of any of embodiments 160 to 175, wherein z is 5.

Embodiment 179 is the method of any of embodiments 160 to 175, wherein L is propylguanidine hydrochloride, the cation is tetrabutylammonium, z is 3, X" is Si—O—Si, and X' is P.

Embodiment 180 is the method of any of embodiments 160 to 163, wherein L is propylguanidine hydrochloride, the cation is potassium, z is 4, X" is Si—O—Si, and X' is Si.

Embodiment 181 is the method of any of embodiments 160 to 163, wherein L is propylamine, the cation is tetrabutylammonium, z is 3, X" is Si—O—Si, and X' is P.

Embodiment 182 is the method of any of embodiments 160 to 163, wherein L is butylamine, the cation is potassium, z is 4, X" is Si—O—Si, and X' is Si.

Embodiment 183 is the method of any of embodiments 160 to 163, wherein L is N-(2-aminoethyl)-3-aminopropyl, the cation is potassium, z is 4, X" is Si—O—Si, and X' is Si.

Embodiment 184 is the method of any of embodiments 160 to 163, wherein L is butyl, the cation is methylguanidinium, z is 4, X" is Si—O—Si, and X' is Si.

Embodiment 185 is the method of any of embodiments 160 to 163, wherein L is propylamine, the cation is potassium, z is 4, X" is Si—O—Si, and X' is Si.

Embodiment 186 is the method of any of embodiments 160 to 163, wherein L is propylamine, the cation is $[CH_3NHCNH_2NH_2]^+$, z is 3, and X' is P.

Embodiment 187 is the method of any of embodiments 160 to 163, wherein L is butyl, the cation is $[CH_3NHCNH_2NH_2]^+$, z is 4, and X' is Si.

Embodiment 188 is the method of any of embodiments 160 to 163, wherein the cation is a monatomic cation selected from sodium, potassium, and lithium.

Embodiment 189 is a reflective photochromic article comprising:

a structural component, wherein the structural component comprises a porous material, a plurality of cavities, or a combination thereof;

a fluid in contact with the structural component; and a polyoxometalate complex comprising a counter cation complexed with either a polyoxometalate anion or a polyoxometalate derivative anion, wherein the polyoxometalate complex is in contact with the fluid, wherein the article is photochromic, and wherein the article has a light transmission of less than 2%.

Embodiment 190 is the reflective photochromic article of embodiment 189, wherein the article is diffusely reflective.

Embodiment 191 is the reflective photochromic article of embodiment 189 or embodiment 190, wherein the article has a light transmission of less than 1%.

Embodiment 192 is the reflective photochromic article of any of embodiments 189 to 191, wherein the article has a light transmission of less than 0.5%.

Embodiment 193 is the reflective photochromic article of any of embodiments 189 to 192, wherein the article exhibits a dynamic range of visible light reflectance of at least 2%.

Embodiment 194 is the reflective photochromic article of any of embodiments 189 to 193, wherein the reflective photochromic article has a reflectance of between 0% and 75% in a colored state.

Embodiment 195 is the reflective photochromic article of any of embodiments 189 to 194, wherein the reflective photochromic article has a reflectance of between 25% and 99% in a non-colored state.

Embodiment 196 is the reflective photochromic article of any of embodiments 189 to 195, further comprising a reflective layer.

Embodiment 197 is the reflective photochromic article of embodiment 196, wherein the reflective layer comprises a diffusive reflective layer.

Embodiment 198 is the reflective photochromic article of embodiment 196 or embodiment 197, further comprising a graphic disposed between the structural component and the reflective layer.

Embodiment 199 is the reflective photochromic article of any of embodiments 196 to 198, wherein the structural component comprises a patterned structural component disposed on the reflective layer.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight.

TABLE 1

Materials

| Material | Vendor | Vendor Location |
| --- | --- | --- |
| Phosphotungstic acid | Alfa Aesar | Ward Hill, MA |
| 1-methylguanidine hydrochloride | TCI | Tokyo, Japan |
| N,N-dimethylformamide (DMF) - solvent | Alfa Aesar | Ward Hill, MA |
| Hexamethylphosphoramide (HMPA) - solvent | TCI America | Portland, OR |
| 1-methyl-2-pyrrolidinone (NMP) - solvent | Alfa Aesar | Ward Hill, MA |
| Nalco 2327 - colloidal silica dispersion | Nalco Co. | Naperville, IL |
| SILQUEST A-174 silane | GE Advanced Materials | Wilton, CT |
| SILQUEST A-1230 silane | GE Advanced Materials | Wilton, CT |
| 1-methoxy-2-propanol - solvent | Aldrich Chemical | Milwaukee, WI |
| SR444 pentaerythritol triacrylate | Sartomer Company | Exton, PA |
| IRGACURE 184 - photoinitiator | Ciba Specialty Chemicals | Tarrytown, NY |
| Isopropyl alcohol - solvent | Aldrich Chemical | Milwaukee, WI |
| 1,6-hexanediol diacrylate - monomer | Alfa Aesar | Ward Hill, MA |
| 2-Butanone (MEK) - solvent | Avantor Performance Materials, Inc. | Center Valley, PA |
| IRGACURE 819 - photoinitiator | Ciba Specialty Chemicals | Tarrytown, NY |
| PARALOID B-44 - MMA copolymer | Dow Chemical Co. | Midland, MI |
| SCOTCH Double Sided Tape with Liner | 3M | St. Paul, MN |
| 0.45 micron hydrophobic polypropylene membrane - structural component | 3M | St. Paul, MN |
| 0.2 micron ethylene chlorotrifluoroethylene membrane - structural component | 3M | St. Paul, MN |
| Channel film - structural component | 3M | St. Paul, MN |

Examples 1-18

Fabrication of Nanovoided Film:

The formulation was made as follows: In a 2 liter (L) three-neck flask, equipped with a condenser and a thermometer, 309 grams (g) of Nalco 2327 (40 wt % solid) and 300 g of 1-methoxy-2-propanol were mixed together under rapid stirring. After that, 9.5 g of Silquest A-174 and 19.0 g of Silquest A-1230 were added, and then the mixture was stirred for 10 minutes. The mixture was heated at 80° C. using a heating mantle for 1 hour, then 400 g of additional 1-methoxy-2-propanol was added. The reaction was kept at 80° C. for 16 hours. The resulting solution was allowed to cool down to room temperature. Most of the water/1-methoxy-2-propanol (about 700 grams) solvent was removed using a rotary evaporator with a 60° C. water-bath, resulting in 48.7 wt % A174/A1230 modified 20 nm silica clear dispersion in 1-methoxy-2-propanol. Finally, 63.4 g of the A-174/A1230 silica solution (as modified above), 20.5 g of SR 444, 1.32 g of the photoinitiator IRGACURE 184, and 87.1 g of isopropyl alcohol were mixed together by stirring to form a homogenous coating solution.

The coating solution was applied as follows: The solution was syringe-pumped at a rate of 5.4 cubic centimeters per minute (cc/min) into an 8 inch (20.3 cm) wide slot type coating die. The slot coating die uniformly distributed a 20.3 cm wide coating onto a 2 mil (50.8 micrometer) PET substrate moving at 5 feet per minute (152 cm/min). After coating, the substrate passed through an enclosure before entering the UV LED polymerization apparatus containing a quartz window for passage of UV radiation. The coatings were thus polymerized.

The UV-LED bank used in this step consisted of a rectangular array of 352 LEDs, 16 downweb by 22 crossweb covering an area of 8 inch by 8 inch (20.3 cm by 20.3 cm) on two water-cooled heat sinks. Each LED (available from Cree, Inc., Durham N.C.) operated at a nominal wavelength of 395 nm, running at 45 Volts at 10 Amps [0.108 J/cm$^2$]. The array was positioned above the cure chamber quartz window at a distance of approximately 2.54 cm from the substrate. The UV LED cure chamber was supplied with 46.7 liters/min (100 cubic feet per hour) of nitrogen from a downstream gas introduction device which resulted in approximately 150 ppm oxygen concentration in the chamber.

After UV LED polymerization, the coating was transported to an oven operating at 150° F. (65.6° C.). The coating was post-cured using a Fusion Systems Model I300P configured with an H-bulb (available from Fusion UV Systems. Gaithersburg Md.). The UV chamber was nitrogen inerted to approximately 50 ppm oxygen.

Synthesis of the N-methylguanidinium Salt of 12-tungstophosphate:

A 20 milliliter (mL) screw-top vial was loaded with phosphotungstic acid (10.0 g, 3.23 millimoles (mmol)) and this was dissolved in distilled water (10 mL) with magnetic stirring. In a separate small vial the 1-methylguanidine hydrochloride (3 equivalents, 9.69 mmol) was dissolved in distilled water (2 mL). The 1-methylguanidine hydrochloride solution was slowly added dropwise to the phosphotungstic acid solution with vigorous stirring. Immediately, a white precipitate formed. This precipitate was collected by vacuum filtration and washed with cold water (3×3 mL). This was air dried on the filter overnight and then dried in a vacuum oven at 60° C. overnight.

Solutions of the Organoammonium POM Salt in High Boiling Point Solvents:

The N-methylguanidinium salt of 12-tungstophosphate (0.5 g) was dissolved in the following solvents (0.5 g of each): N,N-dimethylformamide, hexamethylphosphoramide, and 1-methyl-2-pyrrolidinone such that each was a 50 wt % solution of the active photochromic dye. The POM complex readily dissolved in these solvents with sufficient stirring (approximately 2 hours). All of the solutions became yellow to light brown upon dissolution of the POM. All of these solutions colored when irradiated with 365 nm UV light and bleached when exposed to air in the dark.

Solutions of the Organoammonium POM Salt in Polyethylene Glycols:

The N-methylguanidinium salt of 12-tungstophosphate (0.5 g) was loaded into a vial. To this vial was added 1.5 g-3.5 g (according to the desired concentration in the solution) of one of the following: polyethylene glycol 200 (PEG-200), polyethylene glycol 400 (PEG-400), or polyethylene glycol 600 (PEG-600). To the vial containing the POM and PEG was added a small PTFE coated stir bar and these solutions were stirred a minimum of 16 hours. The solutions were also sonicated for 1 hour at 40° C. All of the samples were irradiated with UV light at 365 nm for about 1 hour. The solutions turned a dark blue that would slowly bleach overnight when the vial was left open to the air.

Gel of Polyethylene Glycol Solution and Acrylate Resin:

The N-methylguanidinium salt of 12-tungstophosphate (0.5 g) was loaded into 3 vials. To a vial was added 1.5 g of one of the following: polyethylene glycol 600 (solution A), methoxy polyethylene glycol (350) monoacrylate (solution B), or poly(ethylene glycol) diacrylate (solution C). To the vials was added a small PTFE coated stir bar and these solutions were stirred a minimum of 16 hours. The solutions were also sonicated for 1 hour or more at 40° C. The POM was partially soluble in poly(ethylene glycol) diacrylate. To this sample was added another 1 g of poly(ethylene glycol) diacrylate and the POM appeared to fully dissolve after additional stirring. These solutions were used to make the following gel precursor: 200 mg of solution A, 200 mg of solution B, 20 mg of solution C, and 2.0 mg of IRGACURE 819.

Liquid Infusion of Nanovoided Film:

The above solutions were each applied to a separate nanovoided film with a plastic or rubber spreader. The haze of the wet film was greatly reduced such that they were essentially clear. Films infused with high boiling point solutions containing POMs colored when irradiated with UV light but the high surface area films also dried very quickly. They could be prevented from drying if they were kept in a solvent saturated atmosphere. All of the films infused with the PEG solutions of POMs colored when irradiated with UV light and bleached when left in the air in the dark. These films did not require a solvent saturated atmosphere to remain clear. The gel resin formulation was infused into a nanovoided film in a similar manner. This was cured under a 365 nm UV mercury lamp for 15 minutes.

TABLE 2

Examples in which an acrylic structural component was used. The dry, porous film thickness was measured with a STARRETT F2730-0 electronic indicator.

| Example | Film thickness (μm) | Fluid or gel | Concentration of POM in solution (wt %) |
|---|---|---|---|
| 1 | 8 | HMPA | 50 |
| 2 | 8 | NMP | 50 |
| 3 | 40 | PEG-200 | 12.5 |
| 4 | 40 | PEG-200 | 15 |
| 5 | 40 | PEG-200 | 20 |
| 6 | 40 | PEG-200 | 25 |
| 7 | 28.5 | PEG-400 | 12.5 |
| 8 | 28.5 | PEG-400 | 40 |
| 9 | 40 | PEG-400 | 20 |
| 10 | 22 | PEG-400 | 20 |
| 11 | 17 | PEG-400 | 20 |
| 12 | 13 | PEG-400 | 20 |
| 13 | 30 | PEG-400 | 20 |
| 14 | 35 | PEG-400 | 12.5 |
| 15 | 40 | PEG-400 | 20 |
| 16 | 22.5 | PEG-400 | 20 |
| 17 | 40 | PEG-600 | 25 |
| 18 | 40 | PEG-acrylate resin | 25 |

Examples 19-20

Resin Formulations and Procedure for Top Coats:

The solvent-based resin formulation for the wire wound rod coating was made as follows: PARALOID B44 resin (1.60 g) was loaded into a vial and dissolved in MEK (2.50 g) and 1-methoxy-2-propanol (2.50 g) with magnetic stirring for 16 hours. To this solution was added 1,6-hexanediol diacrylate (3.30 g), IRGACURE 184 (50 mg), and IRGACURE 819 (50 mg). This mixture was stirred to give a clear, slightly yellow solution (solution 1). The formulation for spin coating was made as follows: The PARALOID B44 resin (1.00 g) was loaded into a vial and dissolved in MEK (2.50 g) and 1-methoxy-2-propanol (2.50 g) with magnetic stirring for 16 hours. To this solution was added 1,6-hexanediol diacrylate (3.90 g), IRGACURE 184 (50 mg), and IRGACURE 819 (50 mg). This mixture was stirred to give a clear, slightly yellow solution (solution 2).

The coating solutions were applied as follows: Solution 1 was coated onto a film with the same construction as Example 17 with a RDS #14 wire wound rod. The coating was dried for 10 minutes at 70° C. and then cured with a Fusion Systems Model MC-6RQN configured with an H-bulb (available from Fusion UV Systems, Gaithersburg, Md.). The UV chamber was nitrogen inerted to approximately 50 ppm oxygen. Solution 2 was coated onto a film with the same construction as Example 17 with dimensions of 1.25 inch×1.25 inch (3.18 cm×3.18 cm) were fixed to 2 inch×3 inch (5.08 cm×7.62 cm) glass microscope slides with SCOTCH double-sided tape by spin coating 2-3 drops at 1000 RPM. The coating was dried for 10 minutes at 70° C. and then cured with a Fusion Systems Model MC-6RQN configured with an H-bulb (available from Fusion UV Systems, Gaithersburg, Md.). The UV chamber was nitrogen inerted to approximately 50 ppm oxygen.

TABLE 3

Examples in which an acrylic structural component was used and a coating layer was applied. The dry, porous film thickness and the coating layer thickness were measured with a STARRETT F2730-0 electronic indicator.

| Example | Film thickness (μm) | Fluid | Concentration of POM in solution (wt %) | Coating Layer | Coating Layer Thickness (μm) |
|---|---|---|---|---|---|
| 19 | 40 | PEG-600 | 25 | solution 1 | 8 |
| 20 | 40 | PEG-600 | 25 | solution 2 | 10 |

Examples 21-23

Fabrication of Microstructured Film:

Micro-replication can be achieved in a number of ways. One illustrative method for replicating the surface structural features of a master mechanical tool into the surface of another material is through thermal embossing (U.S. Pat. Nos. 6,096,247, 5,932,150). For the preparation of thermally embossed materials, it is often convenient and useful to start with material in film form. Optionally, a film for embossing can include multiple layers (U.S. Pat. Nos. 6,737,170, 6,788, 463). Another approach for replicating the surface structure of a master mechanical tool into the surface of polymer is to cure a flowable precursor to the polymer while in contact with the master mechanical tool. Generally, a precursor to the cured polymer can be cast onto a master mechanical tool or into a mold, followed by curing (U.S. Pat. No. 4,576,850). Microstructured films used in the following examples include micro-wells in a triangular array with dimensions: 25 µm diameter, 41 µm pitch, and 20 µm depth; 74 µm diameter, 74 µm pitch and 16 µm depth (the pitch was measured from the centers of adjacent wells). Additionally, a channel film was also used with the following dimensions: 87 µm high louvers, 7.6 µm wide louvers, 29 µm wide channels.

Liquid Infusion of a Microstructured Film:

The N-methylguanidinium salt of 12-tungstophosphate (0.5 g) was loaded into a vial. To this vial was added 1.5 g of polyethylene glycol 600 (PEG-600) and a small PTFE coated stir bar and this solution was stirred a minimum of 16 hours. The solution was also sonicated for 1 hour at 40° C. This solution was dispensed onto each of the microstructured films such that the entire film was covered with a thin layer of the solution. As the air was displaced with the fluid the haze of each of the films decreased. Excess solvent was removed with squeegee using light pressure so as not to remove the fluid from the open pore structure of the films.

TABLE 4

Examples in which a microstructured film was used as a structural component.

| Example | Structure | Feature Pitch & Depth (µm) | Fluid | Concentration of POM in solution (wt %) |
|---|---|---|---|---|
| 21 | Wells | 41, 20 | PEG-600 | 25 |
| 22 | Wells | 74, 16 | PEG-600 | 25 |
| 23 | Channels | 37, 87 | PEG-600 | 25 |

Example 24

Fabrication of Mesoporous or Macroporous Films:

Porous films can be made by a thermally induced phase separation (TIPS) process. Several materials can be processed in this manner including ethylene chlorotrifluoroethylene (U.S. Publication No. 2011/0244013).

Liquid Infusion of Mesoporous or Macroporous Films:

The N-methylguanidinium salt of 12-tungstophosphate (0.5 g) was loaded into a vial. To this vial was added 1.5 g of polyethylene glycol 600 (PEG-600) and a small PTFE coated stir bar and this solution was stirred a minimum of 16 hours. The solution was also sonicated for 1 hour at 40° C. A poly(ethylene-co-chlorotrifluoroethylene) (ECTFE) 35 µm thick film (rated at a 0.2 micron pore diameter) was taped to a glass plate and the above solution was drop cast onto the film. The ECTFE film was slowly infiltrated with the PEG solution which could be visually verified by the substantially lower haze of the wet film. The solution could be carefully distributed along the surface of the film with a plastic or rubber spreader. The excess solution was removed by dabbing with a low-lint lab tissue.

Example 25

Fabrication of Mesoporous or Macroporous Films:

Porous films can be made by a thermally induced phase separation (TIPS) process. Several materials can be processed in this manner including polypropylene (U.S. Pat. No. 4,539,256). After phase separation, the materials can be further processed to alter the surface chemistry of the porous film. One such processing technique treats a porous membrane with a solution of ethylene-vinyl alcohol copolymer to give a hydrophilic membrane (U.S. Publication No. 2011/092606).

Liquid Infusion of Mesoporous or Macroporous Films:

The N-methylguanidinium salt of 12-tungstophosphate (0.5 g) was loaded into a vial. To this vial was added 1.5 g of polyethylene glycol 600 (PEG-600) and a small PTFE coated stir bar and this solution was stirred a minimum of 16 hours. The solution was also sonicated for 1 hour at 40° C. An ethylene-vinyl alcohol copolymer coated polypropylene (EVA on PP) 75 µm thick film (prepared according to examples 15-17 of International Publication No. WO 2010/002512 and rated at a 0.2 µm pore diameter) was taped to a glass plate and the above solution was drop cast onto the film. The film was quickly infiltrated with the PEG solution which could be visually verified by the lower reflectivity of the wet film. The solution was carefully distributed along the surface of the film with a plastic or rubber spreader. The excess solution was removed by dabbing with a low-lint lab tissue.

Example 26

Fabrication of Mesoporous or Macroporous Films:

Porous films can be made by a thermally induced phase separation (TIPS) process. Several materials can be processed in this manner including polypropylene (U.S. Pat. No. 4,539,256).

An Impermeable Macroporous Film as a Porous Cover Film:

The N-methylguanidinium salt of 12-tungstophosphate (0.5 g) was loaded into a vial. To this vial was added 1.5 g of polyethylene glycol 600 (PEG-600) and a small PTFE coated stir bar and this solution was stirred a minimum of 16 hours. The solution was also sonicated for 1 hour at 40° C. A 60 µm thick polypropylene film (rated at a 0.45 µm pore diameter) was cut into 2 inch×1.5 inch (5.08 cm×8.81 cm) strips and fixed to the middle of a 3 inch×2 inch (7.62 cm×5.08 cm) glass microscope slide with ½ inch (1.27 cm) wide strips of 73 µm thick double-sided tape. About 0.15 mL of the above solution was injected into the void space with a syringe equipped with a 25 gauge needle. The test cell was then additionally sealed with ¾ inch (1.9 cm) wide clear tape.

Test Methods:

UV Irradiation Cycling Experiments with a Solvent Saturated Test Cell:

Sample films from Examples 1 and 2 were placed in a glass chamber in which the atmosphere was saturated with the same solvent that was infused into the porous film (i.e., NMP or HMPA) in order to slow down the evaporation of the solution from the film. The sample was irradiated with a UV lamp (365 nm, about 1 mJ·cm$^{-2}$·s$^{-1}$) for 1 hour. The lamp was then turned off for 1 hour. This cycle was repeated and the transmission of the film at a specific wavelength (715 nm) was monitored by UV-vis spectrophotometry. The samples were observed over several cycles.

TABLE 5

Summary of spectrophotometric data versus time for Examples 1 and 2.

| Example | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|
| 1 | 39.3 | 2.9 | 9.6 | −2.3 | 1.15 |
| 2 | 47.7 | 3.7 | 4 | −7.3 | 2.65 |

UV Irradiation Cycling Experiments with Polyethylene Glycol Infused Films:

Sample films from Examples 3 through 18 were irradiated with a UV lamp (365 nm, about 1 mJ·cm$^{-2}$·s$^{-1}$) for 1 hour. The lamp was then turned off for 90 minutes. This cycle was repeated and the transmission of the film at a specific wavelength (715 nm or 650 nm) was monitored by UV-vis spectrophotometry. The samples were observed over several cycles. In cases where a 20% change in transmission required more than the time allotted (i.e., 90 minutes for bleaching), the sample was monitored at the end of the cycling and the lamp was left off for an extend period (e.g., 3 hours).

TABLE 6

Summary of spectrophotometric data versus time for Examples 3 through 18.

| Example | Transmission (%) (colorless state) | Haze (%) (colorless state) | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|---|---|
| 3 | 89.2 | 22.5 | 17.4 | N/A | N/A | −0.55 | 1.31 |
| 4 | 72.3 | 76.4 | 8.0 | N/A | N/A | −0.17 | 0.25 |
| 5 | 77.3 | 73.7 | 9.9 | N/A | N/A | −0.68 | 0.11 |
| 6 | 68.3 | 86.6 | 14.7 | N/A | N/A | −1.19 | 0.42 |
| 7 | 91.3 | 44.7 | 13.1 | N/A | N/A | −0.25 | 0.30 |
| 8 | 91.9 | 4.41 | 56.3 | 5.2 | 25.2 | −3.81 | 0.78 |
| 9 | 91.9 | 4.78 | 23.9 | 53 | 90 | −1.34 | 0.26 |
| 10 | 93.1 | 3.21 | 15.3 | N/A | N/A | −0.77 | 0.33 |
| 11 | 91.3 | 1.93 | 8.6 | N/A | N/A | −0.44 | 0.27 |
| 12 | 91.4 | 1.15 | 6.0 | N/A | N/A | −0.19 | 0.11 |
| 13 | 90.7 | 12.4 | 20.2 | 32 | 52.2 | −1.38 | 0.63 |
| 14 | 92.3 | 3.46 | 9.6 | N/A | N/A | −0.32 | 0.17 |
| 15 | 91.4 | 3.09 | 21.5 | 40 | 100 | −1.41 | 0.74 |
| 16 | 92.2 | 1.31 | 14.0 | N/A | N/A | −0.79 | 0.32 |
| 17 | 91 | 2.52 | 21.7 | 32 | 118 | −1.06 | 0.47 |
| 18 | 90.7 | 11.1 | 23.8 | 40 | 84 | −0.65 | 0.27 |

UV Irradiation Cycling Experiments with Liquid Infused Films that have a Top Coat Layer:

Sample films from Example 19 and Example 20 were irradiated with a UV lamp (365 nm, about 2 mJ·cm$^{-2}$·s$^{-1}$) for 50 minutes. The lamp was then turned off for 130 minutes. This cycle was repeated and the transmission of the film over a range of wavelengths (e.g., 450 nm to 750 nm) was monitored by UV-vis spectrophotometry. The samples were observed over several cycles. In cases where a 20% change in transmission required more than the time allotted (i.e., 130 minutes for bleaching), the sample was monitored at the end of the cycling and the lamp was left off for an extend period (e.g., 4 hours).

TABLE 7

Summary of spectrophotometric data versus time for Examples 19 and 20.

| Example | Transmission (%) (colorless state) | Haze (%) (colorless state) | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|---|---|
| 19 | 90.9 | 2.99 | 43.9 | 10 | 76 | −1.69 | 0.37 |
| 20 | 90.8 | 1.67 | 42.3 | 17 | 54 | −1.37 | 0.47 |

UV Irradiation Cycling Experiments with Liquid Infused Microstructured Films:

Sample films from Examples 21 through 23 were irradiated with a UV lamp (365 nm, about 2 mJ·cm$^{-2}$·s$^{-1}$) for 50 minutes. The lamp was then turned off for 130 minutes. This cycle was repeated and the transmission of the film over a range of wavelengths (i.e., 450 nm to 750 nm) was monitored by UV-vis spectrophotometry. The samples were observed over several cycles.

TABLE 8

Summary of spectrophotometric data versus time for Examples 21 to 23.

| Example | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|
| 21 | 93 | 84 | 5.3 | −0.3 | 0.06 |
| 22 | 90 | 89.5 | 1.3 | −0.02 | 0.02 |
| 23 | 92 | 64 | 2.6 | −0.05 | 0.03 |

UV Irradiation Cycling Experiments with Liquid Infused Macroporous Film in Transmission Mode:

A sample of film from Example 24 was irradiated with a UV lamp (365 nm, about 2 mJ·cm$^{-2}$·s$^{-1}$) for 50 minutes. The lamp was then turned off for 130 minutes. This cycle was repeated and the transmission of the film over a range of wavelengths (i.e., 450 nm to 750 nm) was monitored by UV-vis spectrophotometry. The sample was observed over several cycles.

TABLE 9

Summary of spectrophotometric data versus time for Example 24.

| Example | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|
| 24 | 92.9 | 77.5 | 2.7 | −0.15 | 0.05 |

UV Irradiation Cycling Experiments with Liquid Infused Macroporous Film in Reflection Mode:

A sample of film from Example 25 was placed on a white background and the spectrophotometer was equipped with a diffuse reflectance probe. The sample was irradiated with a UV lamp (365 nm, about 2 mJ·cm$^{-2}$·s$^{-1}$) for 50 minutes. The lamp was then turned off for 130 minutes. This cycle was repeated and the reflection of the film over a range of wavelengths (i.e., 450 nm to 750 nm) was monitored by UV-vis spectrophotometry. The sample was observed over several cycles. In cases where a 20% change in transmission required more than the time allotted (i.e., 130 minutes for bleaching), the sample was monitored at the end of the cycling and the lamp was left off for an extend period (e.g., 3 hours).

TABLE 10

Summary of spectrophotometric data versus time for Example 25.

| Example | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|
| 25 | 24.07 | 8 | 136 | −1.26 | 0.23 |

UV Irradiation Cycling Experiments with a Liquid Impermeable Macroporous Film as a Cover Film:

A sample assemble as given in Example 26 was placed on an aluminum screen support and the spectrophotometer was equipped with a diffuse reflectance probe. The sample was irradiated with a UV lamp (365 nm, about 2 mJ·cm$^{-2}$·s$^{-1}$) for 50 minutes. The lamp was then turned off for 130 minutes. This cycle was repeated and the reflection of the construction over a range of wavelengths (i.e., 450 nm to 750 nm) was monitored by UV-vis spectrophotometry. The samples were observed over several cycles. In cases where a 20% change in transmission required than the time allotted (i.e., 130 minutes for bleaching), the sample was monitored at the end of the cycling and the lamp was left off for an extend period (e.g., 4 hours).

TABLE 11

Summary of spectrophotometric data versus time for Example 26.

| Example | ΔT (%) | Time of Δ20% Coloration (minutes) | Time of Δ20% Fading (minutes) | Initial Rate of Coloring (dT/dt, min$^{-1}$) | Initial Rate of Fading (dT/dt, min$^{-1}$) |
|---|---|---|---|---|---|
| 26 | 33.07 | 4 | 173 | −2.78 | 0.071 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A photochromic article comprising:
    a structural component, wherein the structural component comprises a porous material, a plurality of cavities, or a combination thereof;
    a fluid in contact with the structural component; and
    a polyoxometalate complex comprising a counter cation complexed with either a polyoxometalate anion or a polyoxometalate derivative anion, wherein the polyoxometalate complex is in contact with the fluid, wherein at least a portion of the polyoxometalate complex is dissolved or dispersed in the fluid, and wherein the article is photochromic.

2. The photochromic article of claim 1, wherein the article exhibits a difference in transmission of at least 2% after exposure to light wavelengths of 300 nm to 400 nm for a time of at least 2 minutes.

3. The photochromic article of claim 1, wherein the photochromic article comprises a light transmission of at least 5%.

4. The photochromic article of claim 1, wherein the photochromic article comprises a haze of up to 5%.

5. The photochromic article of claim 1, wherein the structural component comprises a porous polymeric material.

6. The photochromic article of claim 1, wherein the structural component comprises a plurality of interior cavities, wherein the fluid at least partially fills at least a portion of the interior cavities.

7. The photochromic article of claim 1, further comprising an oxygen-permeable material disposed on the structural component.

8. The photochromic article of claim 1, wherein the fluid comprises a solvent having a boiling point of 150 degrees Celsius or higher, a polyalkylene oxide, a gel, an ionic liquid, a plasticizer, or a combination thereof.

9. A reflective photochromic article comprising:
a structural component, wherein the structural component comprises a porous material, a plurality of cavities, or a combination thereof;
a fluid in contact with the structural component; and
a polyoxometalate complex comprising a counter cation complexed with either a polyoxometalate anion or a polyoxometalate derivative anion, wherein the polyoxometalate complex is in contact with the fluid, wherein at least a portion of the polyoxometalate complex is dissolved or dispersed in the fluid, wherein the article is photochromic, and wherein the article has a light transmission of less than 2%.

10. The reflective photochromic article of claim 9, further comprising a reflective layer comprising a diffusive reflective layer.

11. A method of forming a photochromic article comprising:
distributing a polyoxometalate complex in a fluid, the polyoxometalate complex comprising a counter cation complexed with either a polyoxometalate anion or a polyoxometalate derivative anion; and
placing the fluid in contact with a structural component, wherein the structural component comprises a porous material, a plurality of cavities, or a combination thereof,
wherein the article is photochromic and wherein at least a portion of the polyoxometalate complex is dissolved or dispersed in the fluid.

12. A method of changing a light transmission of a photochromic article comprising:
providing a photochromic article comprising:
a structural component, wherein the structural component comprises a porous material, a plurality of cavities, or a combination thereof;
a fluid in contact with the structural component; and
a polyoxometalate complex comprising a counter cation complexed with either a polyoxometalate anion or a polyoxometalate derivative anion, wherein the polyoxometalate complex is in contact with the fluid, wherein at least a portion of the polyoxometalate complex is dissolved or dispersed in the fluid; and
exposing the photochromic article to light wavelengths of 300 nm to 400 nm for a time of at least 2 minutes such that the article exhibits a difference in transmission of at least 1%, or at least 2%, or at least 5%.

13. A method of changing a light reflection of a photochromic article comprising:
providing a photochromic article comprising:
a structural component, wherein the structural component comprises a porous material, a plurality of cavities, or a combination thereof;
a fluid in contact with the structural component; and
a polyoxometalate complex comprising a counter cation complexed with either a polyoxometalate anion or a polyoxometalate derivative anion, wherein the polyoxometalate complex is in contact with the fluid, wherein at least a portion of the polyoxometalate complex is dissolved or dispersed in the fluid; and
exposing the photochromic article to light wavelengths of 300 nm to 400 nm for a time of at least 2 minutes such that a reflection of the article exhibits a difference in reflectance of at least 2%, or at least 5%.

* * * * *

UNITED STATES PATENT AND TRADEMARK OFFICE
CERTIFICATE OF CORRECTION

PATENT NO. : 10,711,182 B2
APPLICATION NO. : 15/741525
DATED : July 14, 2020
INVENTOR(S) : Adam Miller et al.

It is certified that error appears in the above-identified patent and that said Letters Patent is hereby corrected as shown below:

In the Specification

Column 5,
Line 32, delete ("d° and d' configuration)," and insert -- ($d^0$ and $d^1$ configuration), --, therefor.

Column 18,

Lines 46-52, delete " 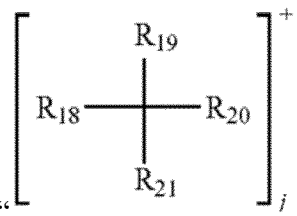 " and insert -- 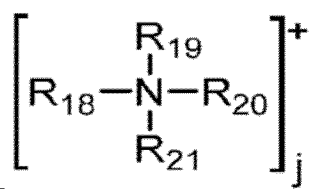 --, therefor.

Column 28,
Line 22, delete "$R_n$" and insert -- $R_{22}$ --, therefor.

Signed and Sealed this
Twentieth Day of October, 2020

Andrei Iancu
*Director of the United States Patent and Trademark Office*